United States Patent [19]
Hart

[11] Patent Number: 5,862,344
[45] Date of Patent: *Jan. 19, 1999

[54] APPARATUS AND METHODS FOR ROUTING DATA PACKETS THROUGH A PROCESSING SYSTEM NETWORK

[75] Inventor: Benjamin P. Hart, Mahtomedi, Minn.

[73] Assignee: NCR Corporation, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 520,320

[22] Filed: Aug. 28, 1995

[51] Int. Cl.⁶ .................................................. G06F 13/00
[52] U.S. Cl. ................................. 395/200.68; 395/200.54
[58] Field of Search ........................ 395/200.15, 200.53, 395/200.54, 200.68, 200.72; 370/85.13–85.16

[56] References Cited

U.S. PATENT DOCUMENTS

| | | | |
|---|---|---|---|
| 5,251,205 | 10/1993 | Callon et al. | 370/60 |
| 5,325,508 | 6/1994 | Parks et al. | 395/425 |
| 5,377,329 | 12/1994 | Seitz | 395/250 |
| 5,394,402 | 2/1995 | Ross | 370/94.1 |
| 5,394,526 | 2/1995 | Crouse et al. | 395/200 |
| 5,426,637 | 6/1995 | Derby et al. | 370/85.13 |
| 5,432,907 | 7/1995 | Picazo, Jr. et al. | 395/200 |
| 5,434,863 | 7/1995 | Onishi et al. | 370/85.13 |
| 5,463,735 | 10/1995 | Pascucci et al. | 395/200.1 |
| 5,526,489 | 6/1996 | Nilakantan et al. | 395/200.02 |
| 5,535,338 | 7/1996 | Krause et al. | 395/200.2 |

OTHER PUBLICATIONS

C. Hedrick, "Routing Information Protocol," Network Working Group, RFC 1058 Jun. 1988 pp. 1–33.
Rekhter et al, "Application of Border Gateway Protocol in the Internet", T.J. Watson Research Center, IBM Corp. RFC 1772 Mar. 1995.
Sidney Feit, "TCP/IP Architecture, Protocols and Implementation," McGraw–Hill Series on Computers, 1993, pp. 333–384.
David C. Plumm, "An Ethernet Address Revolution Protocol", Network Working Group, RFC 826, Nov. 1982 pp. 1–10.
Publication "Comten HA–MCAM and MCAM" AT&T Global Information Solutions Company, SP–4355 May 1995.
Publication "Comten 5675–B Communications Processor", NCR An AT&T Company, SP–4359 1093.

Primary Examiner—Mehmet B. Geckil
Attorney, Agent, or Firm—Davis Hoxie Faithful & Hapgood

[57] ABSTRACT

Apparatus and methods are presented for providing processing system network connectivity, and more particularly, for routing data packets between at least two processing system networks. A first memory for storing at least one address for each of the networks, and a second memory for storing selectively at least one address for particular ones of the networks, are provided. A control circuit for routing a received data packet from a source network to a destination network is also provided. The control circuit utilizes a destination address which was retrieved from one of the first memory and the second memory, in response to a determination as to whether at least one address corresponding to the destination network is stored in the second memory.

33 Claims, 9 Drawing Sheets

APPARATUS AND METHODS FOR ROUTING DATA PACKETS THROUGH A PROCESSING SYSTEM NETWORK

A portion of the disclosure of this patent document contains material that is subject to copyright protection. The copyright owner has no objection to the facsimile reproduction by anyone of this patent document or the patent disclosure, as it appears in the Patent and Trademark Office patent files or records, but otherwise reserves all copyright rights whatsoever.

TECHNICAL FIELD OF THE INVENTION

The present invention relates generally to processing system network connectivity, and more particularly, to apparatus and methods for routing data packets through a processing system network.

BACKGROUND

A processing system network, such as a computer network, is a combination of two or more independent nodes capable of communicating with one another over a communications path or link. A network node may be an independent processing system, such as a personal computer, or another processing system network.

Network nodes communicate with one another in order to share resources, such as databases and data files, software applications, hardware peripherals and communication links. Communication links are shared, for example, to enable two or more nodes which are not directly linked together to communicate through one or more intermediate nodes. Resource sharing generally involves the transfer and reception of large amounts of data. The data is typically divided into packets, frames, groups, etc. ("data packets"). Each data packet includes a collection of related data items, as well as any information necessary to route the data packet between network nodes.

Networks traditionally belong in one of two general categories, namely, local area networks ("LANs") and wide area networks ("WANs"). A LAN is a group of communicating nodes which are located relatively close to one another, such as within the same building or building complex. The communication links between LAN nodes are typically characterized by relatively high-speed data packet transfers. A WAN, on the other hand, is a collection of independent and distinct network nodes which work together over relatively long distances. Communication links between WAN nodes are routinely provided by third-party carriers such as by long-distance telephone companies. The InterNet is an example of a worldwide WAN. Communications between WAN nodes are generally characterized by relatively slower data packet transfers as compared with communications between LAN nodes.

Many organizations setup LANs at different strategic locations, such as on each floor of an office building or at each one of several different buildings. It often becomes necessary to share resources among LANs.

There are two broad approaches for establishing LAN-to-LAN communications, namely, private ownership and leasing from commercial communication suppliers. Many organizations setup their own private electric, microwave, light beam and/or fiber optic transmission systems to carry data locally around metropolitan areas and campuses. However, when communication connections extend beyond a particular area, circuits are typically leased from commercial suppliers, including telephone carriers such as AT&T (New York, N.Y.) and MCI (Washington, D.C.); specialized communications companies such as Tymnet (British Telecommunications Public Limited Company, located in London, England) and Telenet (Sprint International Communication Corporation, located in Reston, Va.); and satellite system providers such as GTE (Stamford, Conn.).

Leased services typically fall into one of three general categories, namely, circuit-switched, full-period and packet-switched. Circuit-switched services are those with a dial tone, such as switched-56 digital services or the Integrated Services Digital Network ("ISDN"), for example, wherein a connection is dialed, data is transferred, and the system hangs up upon completion of the transaction. Full-period services, such as leased telephone lines, provide a circuit dedicated to an organization's full time use. Packet-switched systems, such as CompuServe (Columbus, Ohio), Tymnet and SprintNet (Kansas City, Mo.), for example, allow multi-point connections for bursts of short data packets. Packet-switched networks, also called X.25 networks after an older Consultive Committee International Telegraph and Telephone ("CCITT") packet-switching standard, commonly use a newer standard called frame relay.

Network portal devices are used to couple LANs and WANs together (i.e., LAN-to-LAN, LAN-to-WAN and WAN-to-WAN). The conventional approach is to use the portal device as a junction point through which data packets received from a source network are routed to one or more destination networks. The portal device typically includes control circuitry and a memory.

The memory typically includes the routing address for each LAN and each WAN coupled to the portal device, and typically includes the address of one or more of the nodes of each of the LANs and WANs. In the event that a particular network node is itself a LAN or a WAN, the addresses of one or more of its nodes are also often stored within the memory.

When a data packet is forwarded from a LAN node to a WAN node, the data packet is received by the portal device. The control circuitry searches the memory and retrieves the address of the destination WAN node. The control circuitry recognizes from the memory search that the destination node exists on a WAN and will typically wrap the data packet in a "data envelope" along with additional routing and transmission information. This additional information tells the commercial communication suppler how to route the data packet to the destination WAN node.

In an alternative case wherein a data packet is forwarded from one LAN node to another LAN node, the data packet is received by the portal device and the control circuitry is again required to search the memory. The control circuitry upon retrieving the address of the destination LAN node from memory determines whether the data packet requires additional processing, such as being wrapped in the aforementioned data envelope. Upon a determination that no additional processing is required, the control circuitry forwards the data packet to the destination LAN node.

Thus, although the foregoing process is both necessary and effective for processing a data packet routed to the WAN, it is equally unnecessary and ineffective when routing a data packet between LAN nodes. In point of fact the search and retrieval processes performed by the control circuitry when transferring a data packet from one locally connected LAN to another cause significant delays. The delay is compounded by the determination as to whether the data packet requires additional processing. These delays are compounded still further when considering that the portal device may, and often does, receive hundreds, if not thousands, of data packets per second. Many, if not most, of these data packets are queued and routed on a first come, first serve basis. A LAN-to-LAN data packet that is preceded by several data packets requiring special processing typically is required to wait unnecessarily. This wait curtails portal device throughput and the overall functionality of the processing system network.

Accordingly, there exists a need in the art to substantially eliminate delays associated with routing a data packet between two nodes wherein the data packet requires little or no additional processing.

There exists a further need to substantially eliminate delays associated with routing a data packet from a source LAN to a destination LAN.

There exists a still further need to reduce over-all memory access time associated with searching and retrieving addressing data from the memory of a portal device.

SUMMARY OF THE INVENTION

Broadly, the present invention is directed to apparatus and methods which provide processing system network connectivity, and more particularly, which enable data packets to be routed through a processing system network. The processing system network includes a plurality of sub-processing system networks (also called "sub-networks") wherein each sub-network is either a LAN or a WAN and includes at least one node. Each node may be either a processing system or another sub-network.

An apparatus in accordance with the principles of the present invention routes ones of a plurality of data packets between at least two of a plurality of sub-networks of a processing system network. Preferably the apparatus includes first and second memories and a control circuit. The first memory is operative to store addressing data for routing ones of the data packets between at least two of the sub-networks. The second memory is operative to store selectively addressing data for routing ones of the data packets between particular ones of the sub-networks.

An important aspect regarding the functionality provided by either or both of the first and second memories is that it may in point of fact be provided by one or more suitably arranged conventional memory storage devices and/or data structure configurations.

The control circuit is operative to receive at least one data packet. The data packet includes destination indicia which directs the control circuit to route the received data packet from a first sub-network to at least a second sub-network. The control circuit retrieves a routing address associated with the destination indicia from either the second memory, in the event that the routing address is selectively stored therein, or the first memory otherwise. The retrieved routing address is utilized by the routing circuit to route the received data packet to the second sub-network.

An important aspect of any circuit, and more generally any apparatus, in accordance with the principles of the present invention is that it may be processing system, firmware or hardware based.

A processing system network in accordance with the principles of the present invention includes a plurality of sub-networks and an apparatus for routing ones of a plurality of data packets between at least two of the sub-networks. Each one of the sub-networks preferably includes at least one node.

The apparatus includes first and second memories and a circuit. The circuit is preferably in operative communication with both memories. The first memory operates to store a plurality of addresses for use in routing ones of the data packets between ones of the sub-networks. The second memory operates to store selectively ones of the addresses for use in routing ones of the data packets between particular ones of the sub-networks.

The circuit is preferably suitably arranged to route a received data packet from a first node of a first sub-network to a second node of a second sub-network. The circuit operates to retrieve an address associated with the second node from either the second memory, in the event the associated address is selectively stored therein, or the first memory otherwise. The retrieved address is utilized by the apparatus to route the received data packet to the second node.

A method in accordance with the principles of the present invention concerns routing ones of a plurality of data packets between at least two of a plurality of sub-networks of a processing system network. At least one address for each one of the sub-networks is stored in a first memory. At least one address for particular ones of the sub-networks is stored selectively in a second memory. A data packet from a first sub-network is received. The data packet includes destination indicia which indicates that the received data packet is to be routed to at least a second sub-network. A determination is made as to whether at least one address associated with the second sub-network is stored in the second memory. The received data packet is routed to the second sub-network utilizing, in response to the determination, the associated address stored in one of the second memory or the first memory.

One embodiment for using and/or distributing the present invention is as software. The software includes a plurality of processing unit instructions which are stored to a conventional storage medium. The instructions are readable and executable by one or more processing units. The instructions, upon execution, operate to control the one or more processing units to route data packets through a processing system network. Preferred storage media include without limitation, magnetic, optical, and semi-conductor, as well as suitably arranged combinations thereof.

BRIEF DESCRIPTION OF THE DRAWINGS

For a more complete understanding of the present invention, and the advantages thereof, reference is now made to the following Detailed Description of the Invention taken in conjunction with the accompanying drawings in which like numbers designate like parts, and in which.

DETAILED DESCRIPTION OF THE INVENTION

Figure 1:
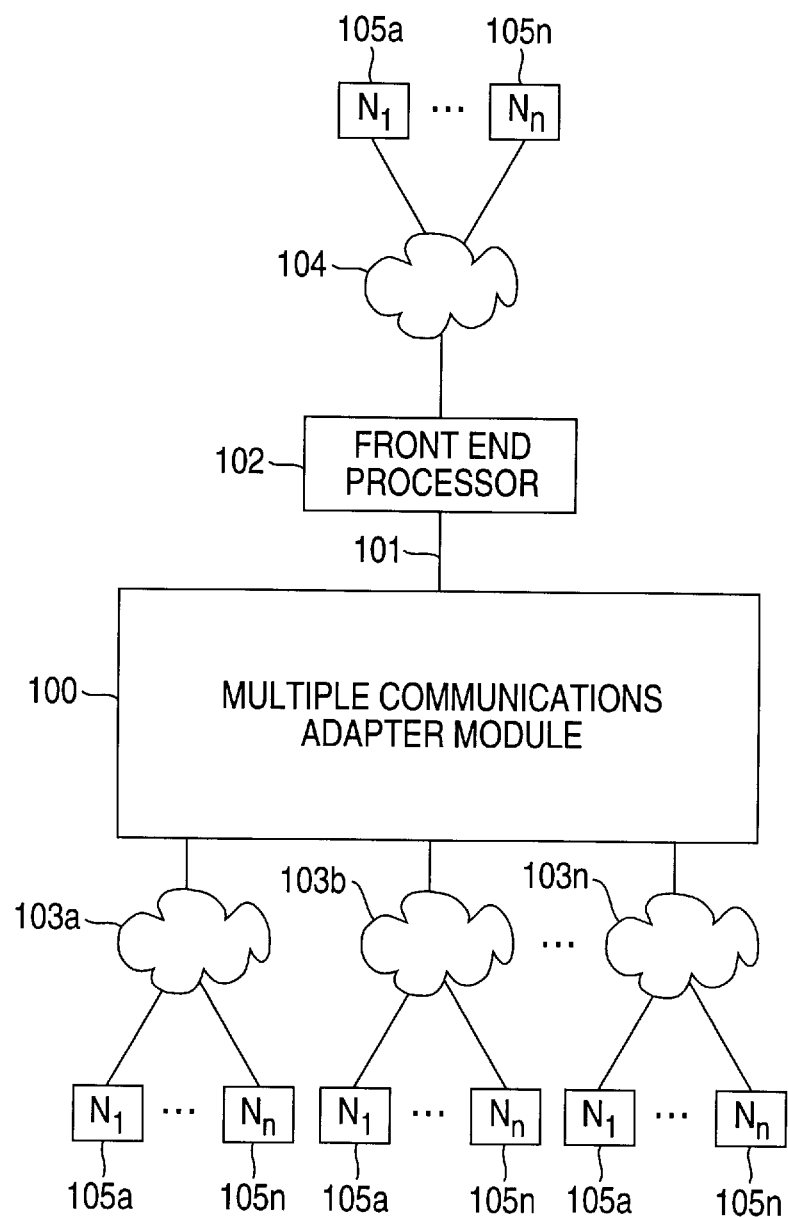
FIG. 1 illustrates a block diagram of an exemplary processing system network.

FIG. 1 illustrates a block diagram of an exemplary processing system network in which the principles of the present invention are particularly advantageous. A Multiple Communications Adapter Module ("MCAM") 100, a network to network portal device, is shown suitably coupled via communications bus 101 with a Front End Processor ("FEP") 102. In a preferred exemplary embodiment, MCAM 100 is an Intel 486-based micro-channel subsystem, model no. 2705, available from AT&T Global Information Solutions ("AT&T GIS"), located in St. Paul, Minn. and Dayton, Ohio; communications bus 101 is a SCSI II communications cable available from AT&T GIS, located in St. Paul, Minn. and Dayton, Ohio; and FEP 102 is a Comten 56XX front end processor available from AT&T GIS, located in Dayton, Ohio. The preferred MCAM 100 embodiment is more fully disclosed in the Comten HA-MCAM and MCAM Brochure, Document No. SP-4355, which is incorporated herein by reference. This documentation is available upon request from AT&T GIS by contacting AT&T GIS Information Products Publishing which is located in Dayton, Ohio, U.S.A.

The Comten 56XX FEP includes up to eight SCSI ports, and is operative to connect up to seven MCAMs 100 together on each of its SCSI ports, for a total of 56 possible MCAMS 100. The Comten 56XX FEP is more fully disclosed in the "Comten 5675-B Communications Processor," NCR Document No. SP-4359–1093, which is incorporated herein by reference. This documentation is also available upon request from AT&T GIS by contacting AT&T GIS Information Products Publishing which is located in Dayton, Ohio, U.S.A.

MCAM 100 is operative to provide processing system network connectivity enabling the sharing of resources among a plurality of high-speed LANs 103a to 103n and one or more slower WANs 104 via FEP 102. More particularly, MCAM 100 is operative to route a received data packet from a first node associated with a first processing system network to a second node associated with a second processing system network. Exemplary network interfaces to which connectivity is provided include without limitation ISDN, Frame Relay, Token Ring, Ethernet, TCP/IP Channel, FDDI, and the like.

Resource sharing among network nodes is typically governed by two sets of rules, namely, standards and protocols. Standards describe minimum performance levels for various aspects of the network, as well as performance levels of individual network nodes. Protocols define the interaction between the communicating nodes, providing file transfer, remote log-in, electronic mail, and other services, including without limitation distributed processing and shared use of peripheral devices. The aforementioned non-exclusive list of interfaces are each based upon particular protocols and standards. For example, the InterNet Protocol ("IP") governs a worldwide network of networks. IP, among its other facilities, enables a data packet from a source node to traverse multiple networks on its way to one or more destination network nodes.

Each of the illustrated LANs 103a to 103n includes a plurality of nodes 105a to 105n, as does WAN 104 which also includes nodes 105a to 105n. Each one of the nodes 105a to 105n may in point of fact be a single processing system, or alternatively, may be a separate processing system network. Further, although WAN 104 and LANs 103a to 103n have each been shown to include a plurality of nodes, each may include as few as a single node.

Conventional data transmission media, such as copper wire or fiber optic cable, are typically used to couple LANs 103a to 103n to MCAM 100. These cables may extend over relatively long distances, and may accumulate noise from the outside environment as well as from one another. As the pulses of electricity or light representing the data packets traverse the exemplary copper wires or fiber optic cables, they may lose sharpness and/or experience signal degradation. Induced noise and signal degradation are two primary factors limiting the effective length of conventional high-speed LAN cable. Long-distance LAN-to-LAN connections accordingly move data more slowly than local LAN-to-LAN connections and often require intermediate signal processing and quality checks between LANs.

The principles of the present invention are well suited, from both a practical as well as an illustrative standpoint, for providing network connectivity between LANs and WANs. These same principles are also in point of fact particularly advantageous in providing network connectivity in many other communication applications wherein one or more transferred data packets may or may not require special processing. Preferably, the one or more data packets are passed from at least one node of at least one sub-processing system network to at least one node of at least a second sub-processing system network. Other examples include, without limitation, connectivity between sub-networks using private and public communication links, as well as, sub-networks using wired (e.g., copper wire, fiber optic cable, etc.) and wireless (e.g., radio wave, microwave, etc.) communications, for example.

Figure 2:
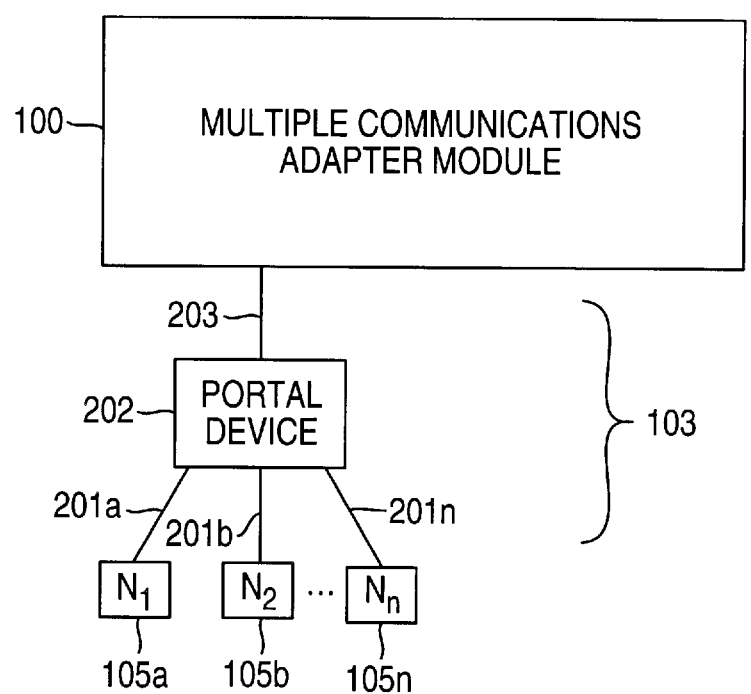
FIG. 2 illustrates a block diagram of an exemplary LAN which may suitably be arranged for use in conjunction with the processing system network of FIG. 1.

FIG. 2 illustrates a block diagram of an exemplary LAN, such as any of LANs 103a to 103n, which may suitably be arranged for use in conjunction with the processing system network of FIG. 1. The illustrated LAN includes a plurality of processing system nodes 105a to 105n which are coupled via cables 201a to 201n (e.g., a conventional voice-data line) to a network portal device 202. Device 202 is coupled via cable 203 to MCAM 100. Device 202 is operative to transfer one or more data packets between two or more nodes within LAN 103, or between one or more nodes of LAN 103 and a node of another network (not shown) via MCAM 100. Data packet transference using MCAM 100 typically requires utilization of one or more common protocols.

Network portal devices (e.g., bridges, routers, etc.) are typically used to link LANs and WANs and to exercise discrimination over the traffic passing between them. Bridges may be used, for example, to link the fast cable of a LAN to slower links, such as LANs and WANs using leased telephone lines. The primary purposes of a bridge are to extend a processing system network and to isolate network traffic, transferring data packets between various types of media and forwarding only traffic which is addressed to devices of another cable system. Conventionally, local bridges link fast cable segments on a local network and remote bridges link fast local cables to slower long-distance cables to connect physically separated networks.

Routers are operative to read more complex network addressing information from within a transmitted data packet. Routers often add additional information in order to route the data packet through the network. For example, a router might wrap an Ethernet data packet in an "envelope" of data containing routing and transmission information for transmission through an X.25 packet-switched network. When the data envelope passes through the X.25 network, a receiving router strips off the X.25 data, readdresses the Ethernet data packet, and sequences it on its attached LAN segment. Routers may choose from redundant paths between networked segments or may link networked segments using very different data packaging and media accessing schemes.

Figure 3:
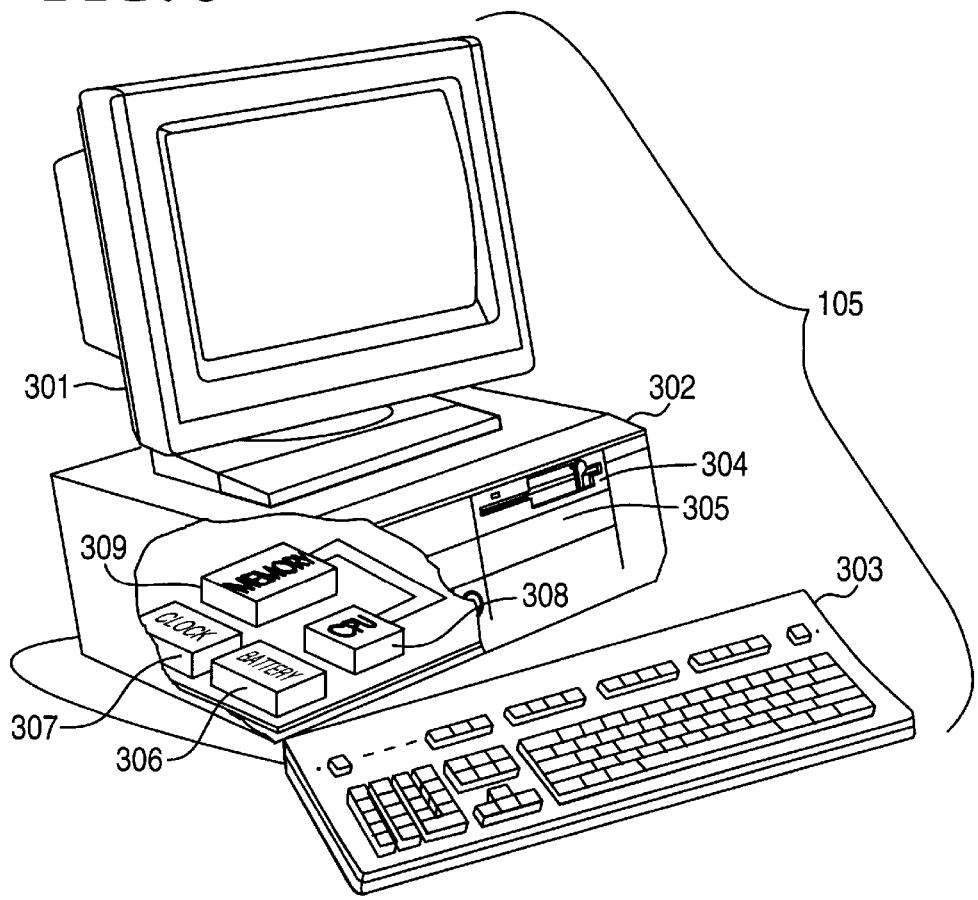
FIG. 3 illustrates an isometric view of an exemplary processing system capable of functioning as a node within the processing system network of FIG. 1 and the LAN of FIG. 2.

FIG. 3 illustrates an isometric view of an exemplary processing system 105 capable of functioning as a network node. Processing system 105 is a suitably equipped conventional personal computer, such as a model no. System 3333, from AT&T GIS, located in Dayton, Ohio, for example.

Processing system 105 includes a monitor 301, a housing 302 and a keyboard 303. Monitor 301 and keyboard 303 may suitably be replaced by other conventional output and input devices, respectively. Housing 302 includes both a floppy disk drive 304 and a hard disk drive 305. Floppy disk drive 304 is suitably operative to receive, read and write to external disks and hard disk drive 305 is suitably operative for fast access storage and retrieval. Floppy disk drive 304 may be replaced by conventional with other conventional structures operative to receive and transmit data and/or instructions, including without limitation, tape and compact disc drives, telephony systems and devices (including conventional telephone, videophone, facsimile, and paging technologies), and serial and parallel ports.

Housing 302 is illustrated having a cut-away portion which includes a battery 306, a clock 307, a processing unit 308 and a memory storage device 309. Processing unit 308 is suitably coupled with memory storage device 309. Although processing system 105 is illustrated having a single processing unit, a single hard disk drive and a single memory storage device, processing system 105 may be equipped with a plurality of processing units and/or suitably arranged memory storage devices.

It should be noted that any conventional processing system having at least one processing unit and which is suitable to function as a network node may replace, or be utilized in conjunction with, processing system 105, including without limitation, videophones, telephones, televisions, sophisticated calculators and, hand-held, laptop/notebook, mini, mainframe and super computers, including RISC and parallel processing architectures, as well as within processing system network combinations of the foregoing. Conventional processing system architecture is more fully discussed in *Computer Organization and Architecture,* by William Stallings, MacMillan Publishing Co. (3rd ed. 1993), which is incorporated herein by reference.

Figure 4:
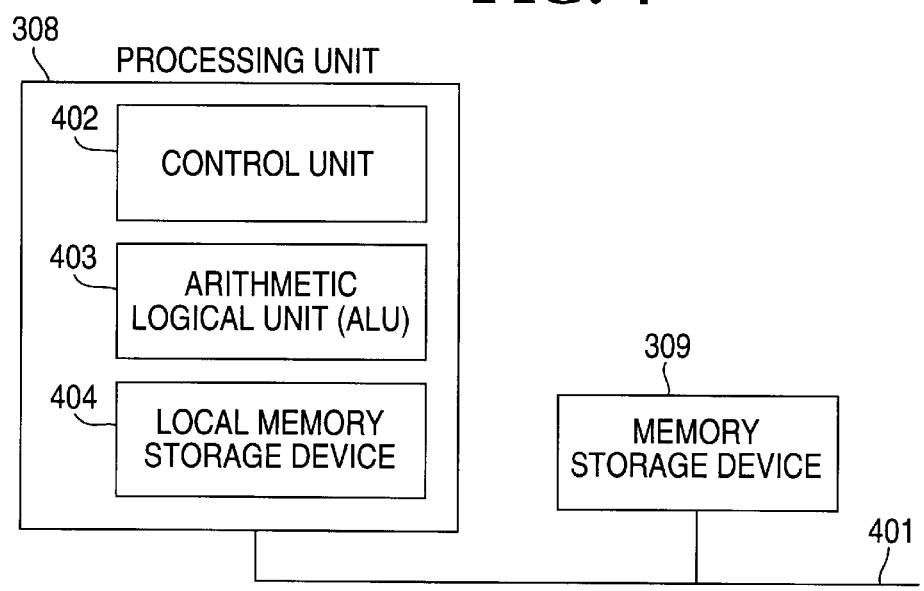
FIG. 4 illustrates a block diagram of a microprocessing system which may be utilized in conjunction with the processing system of FIG. 3.

FIG. 4 illustrates a block diagram of one exemplary microprocessing system which may suitably be utilized in conjunction with processing system 105 of FIG. 3. The microprocessing system includes a single processing unit 308 coupled via data bus 401 with a single memory storage device 309. Memory storage device 309 is suitably operative to store data and/or one or more processing system instructions which processing unit 308 is operative to retrieve and execute. Memory storage device 309 may be any suitable conventional memory storage device. Processing unit 308 includes a control unit 402, an arithmetic logic unit ("ALU") 403, and a local memory storage device 404 (e.g., stackable cache, a plurality of registers, etc.). Control unit 402 is operative to fetch processing system instructions from memory storage device 309. ALU 403 is operative to perform a plurality of operations, including without limitation addition and Boolean AND, needed to carry out those instructions. Local memory storage device 404 is operative to provide local high speed storage used for storing temporary results and control information.

Figure 5:
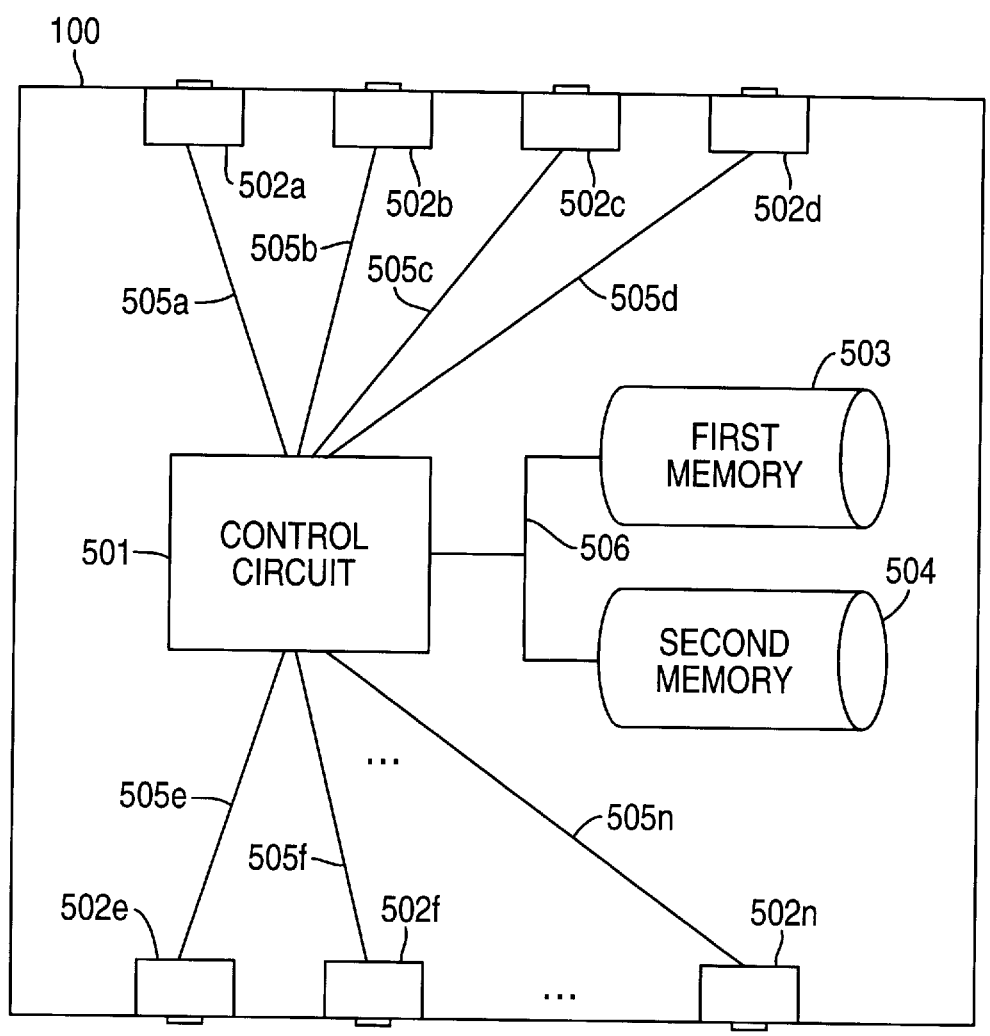
FIG. 5 illustrates a block diagram of an exemplary circuit operable to facilitate communications between one or more processing system nodes and/or processing system networks in accordance with the principles of the present invention.

FIG. 5 illustrates a detailed block diagram of MCAM 100, as previously shown in FIGS. 1 and 2, and in which the principles of the present invention are particularly advantageous. MCAM 100 is operative to facilitate communications between two or more processing system networks and their respective nodes. MCAM 100 includes a control circuit 501, a plurality of network interfaces 502a to 502n, a first memory 503 and a second memory 504.

Control circuit 501 is shown suitably coupled via buses 505a to 505n to each one of the network interfaces 502a to 502n, and via bus 506 to first memory 503 and second memory 504. Each of the network interfaces 502a to 502n is operative to link MCAM 100 with a different sub-processing system network, thus providing a shared boundary defining functional, signaling and physical interconnection capabilities. For example, one or more of the network interfaces 502a to 502n might be an Ethernet or a Token Ring LAN Micro Channel adapter. Alternatively, one or more of the network interfaces 502a to 502n might be a conventional WAN interface, such as a frame relay TCP/IP interface, for example.

Data packets received by MCAM 100 are suitably processed to determine their respective destinations. Preferably, each received data packet includes destination indica, among other data, directing MCAM 100, and more particularly control circuit 501, to destination route each received data packet. In alternate embodiments, other indica may also be included within one or more data packets. This other indica may, for example, direct control circuit 501 to perform a particular task or it may indicate that the data packet under consideration has specific processing requirements. These particular aspects of the invention will be more fully discussed momentarily.

Figure 8:
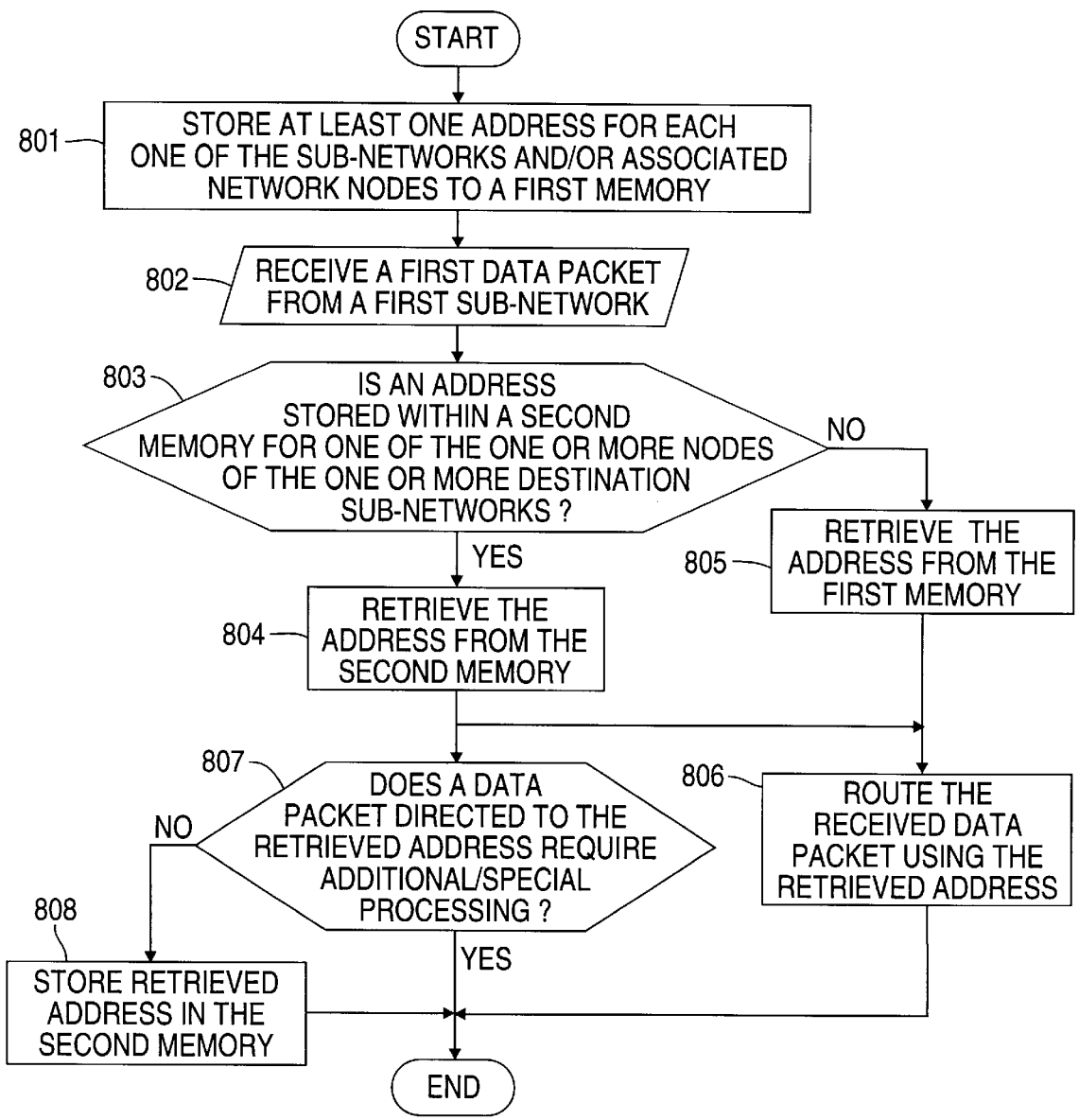
FIG. 8 illustrates a flow diagram for controlling the routing of a data packet through a processing system network in accordance with the principles of the present invention.

First memory 503 preferably functions as a main memory and is operative to store addressing data for routing data packets from a source network to one or more destination networks via the network interfaces 502a to 502n. Second memory 504 preferably functions as a fast "look up" memory and is operative to store selectively addressing data for routing data packets between particular source and destination networks, again, via the network interfaces 502a to 502n. More particularly, second memory 504 is preferably a high-speed buffer storage that is continuously updated to contain recently accessed contents of first/main memory 503 (e.g., addressing data). An important aspect of second memory 504, which will be discussed in greater detail with reference to FIG. 8, is the reduction of over-all memory access time.

Although memories 503 and 504 are illustrated as separate memory storage devices, the functionality supported by each may suitably be provided utilizing one or more data structures within one or more suitable memory storage devices. Further, although memories 503 and 504 are shown to juxtapose control circuit 501, either one, or both, may in point of fact be located within circuit 501, or alternatively external and juxtaposed to MCAM 100.

Control circuit 501 is operative to determine whether addressing data corresponding to the destination indica of a received data packet has been stored within second memory 504. If the destination addressing data is stored in second memory 504 then it is retrieved therefrom, otherwise the destination addressing data is retrieved from first memory 503. Control circuit 501 utilizes the retrieved addressing data to destination route a particular received data packet.

In the event that the addressing data was retrieved from first memory 503 and not second memory 504, control circuit 501, as will also be discussed in greater detail with reference to FIG. 8, may update second memory 504 so it contains the retrieved addressing data from first memory 503.

In one preferred exemplary embodiment, second memory 504 is accessed first. The determination is made as to whether addressing data corresponding to the data packet's destination indica has been stored in second memory 504. If not, then first memory 503 is accessed. In other words, control circuit 501 is operative to sequentially access second memory 504 and then optionally first memory 503.

In another preferred exemplary embodiment, control circuit 501 is operative to access first memory 503 and second memory 504 substantially in parallel. Preferably, both memories 503 and 504 are accessed, a determination is made as to whether addressing data corresponding to the data packet's destination indicia has been stored in second memory 504, and if it has been stored therein, control circuit 501 aborts further access to first memory 503. An important aspect of accessing both memories in tandem, is that any latency associated with the sequential accessing embodiment discussed above is substantially eliminated.

Control circuit 501 is further operative to monitor one or more of the network interfaces 502a to 502n to determine whether addressing data associated with any one the interfaces has changed. In the event that one or more network addresses have changed, the addressing data associated with those interfaces which are stored in first memory 503 and/or second memory 504 will be updated to reflect the changed address. In an alternate embodiment, addressing data associated with a changed interface, will be deleted from second memory 504 and may be re-stored at a later time, again as will be discussed with reference to FIG. 8, to reflect the addressing data from first memory 503.

Alternate preferred exemplary embodiments providing network connectivity include without limitation programmable logic devices, such as PALs (programmable array logic) and PLAs (programmable logic arrays), DSPs (digital signal processors), FPGAs (field programmable gate arrays), ASICs (application specific integrated circuits), and the like.

Figure 6:
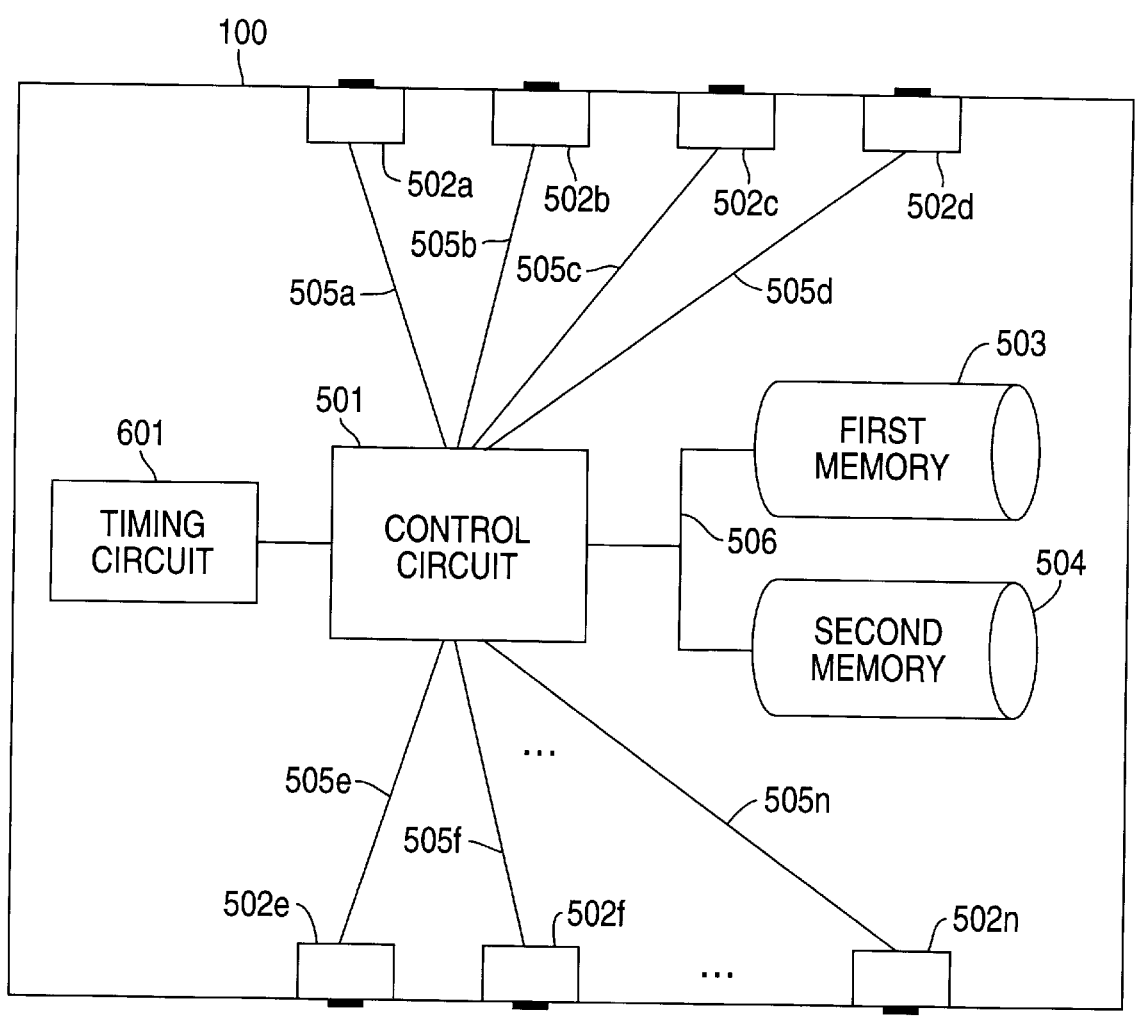
FIG. 6 illustrates a block diagram of an exemplary conventional timing circuit which may be utilized in conjunction with an exemplary control circuit shown in FIG. 5.

FIG. 6 illustrates a block diagram of an exemplary conventional timing circuit 601 which may be utilized in conjunction with control circuit 501 of FIG. 5. Although timing circuit 601 is shown coupled with control circuit 501 within MCAM 100, in point of fact, timing circuit 601 may also be located within control circuit 501, or may be external to and juxtapose MCAM 100.

Timing circuit 601 is operative to generate one or more signals indicating passage of a time period (e.g., second, millisecond, etc.) during which addressing data associated with one or more interfaces 502a to 502n has remained stored in memory. Control circuit 501 is operative to compare one or more of the generated signals with a predetermined value (e.g., a threshold value, a conventional time-out value, etc.) to determine whether the addressing data has remained stored for too long. In response to a determination that one or more particular signals compare unfavorably to the value, such as to exceed or equal a threshold value for example, control circuit 501 is further operative to update or delete the addressing data corresponding to the particular interfaces 502a to 502n associated with those particular signals from either one, or both, first and second memories 503 and 504, respectively.

Figure 7:
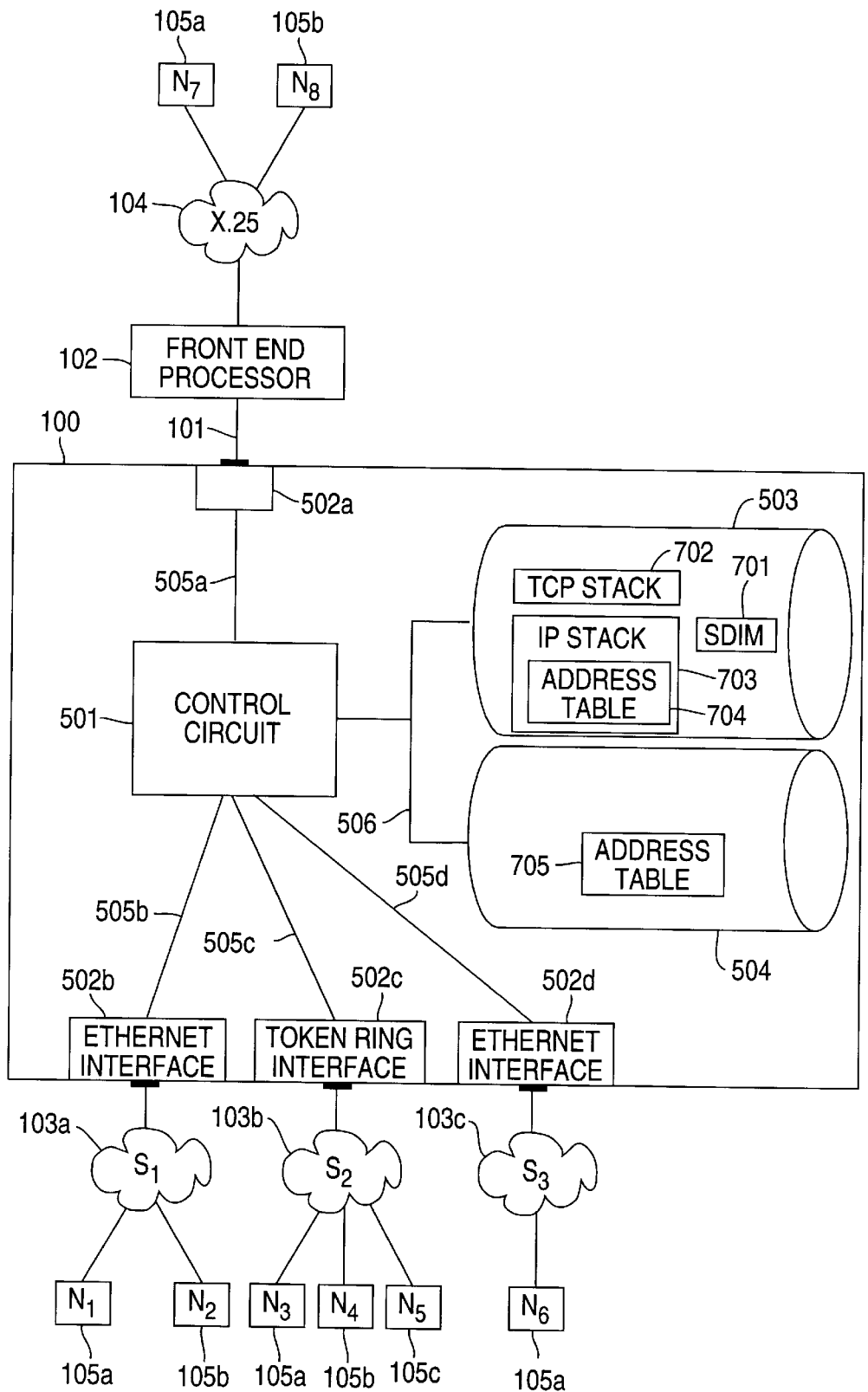
FIG. 7 illustrates a more detailed block diagram of one embodiment of the exemplary processing system network of FIG. 1.

FIG. 7 illustrates a more detailed block diagram of one embodiment of the exemplary processing system network of FIG. 1 wherein MCAM 100 is operative to provide network connectivity between a WAN 104 and a plurality of LANs 103a to 103c. Exemplary WAN 104 is a X.25 TCP/IP network. Exemplary LANs 103a and 103c are each an Ethernet TCP/IP sub-network or non-sub-netted network of TCP/IP workstations, wherein the sub-network is comprised of a single Ethernet media or Ethernet network fabric (i.e., coax-cables or twisted copper pair wire and Ethernet hubs). Exemplary LAN 103b is a Token Ring TCP/IP sub-network or non-sub-netted network of TCP/IP workstations on a Token Ring or set of bridged Token Rings.

MCAM 100 includes a TCP/IP interface 502a, two Ethernet interfaces 502b and 502d, and a Token Ring interface 502b. Exemplary TCP/IP interface 502a provides connectivity between MCAM 100 and FEP 102. Exemplary Ethernet interfaces 502b and 502d may be, for example, Cogent Ethernet Micro-Channel Adapters, model no. F110, available from AT&T GIS, located in Dayton, Ohio. Exemplary Token Ring interface 502c may be a Micro-Channel Token Ring Adapter, model no. F111, available from AT&T GIS, located in Dayton, Ohio.

First memory 503 includes a Spider Data link Interface Module ("SDIM") 701, a TCP stack 702 and an IP stack 703. SDIM 701 is operative to provide a generic lower streams interface for all LAN interfaces (also known as "drivers") 502b–502n to the main TCP/IP protocol stack. SDIM is also used to utilize IP and ARP streams to these drivers. An ARP stream is a special stream to the TCP/IP Stack that is used to pass Address Resolution Protocol frames to the IP layer in the TCP/IP stack. TCP stack 702 is operative to provide TCP protocol support to all devices contained in connected networks (TCP provides end point functions such as FTP, Telnet, NFS, etc.). IP stack 703 includes an address table 704, and is operative to provide routing between LAN and WAN nodes 105. Address table 704 is operative to provide network configuration information that may, for example, have been statically defined, determined in real time via network frame receipt, and the like.

Similarly, second memory 504 includes an address table 705 which like address table 704 is operative to provide selective access to the above-identified information stored in address table 704. More particularly, the entries in address table 705, unlike address table 704, are limited to selectively stored addressing data for routing data packets between particular ones of source and destination nodes 105 (e.g. $N_1$–$N_6$). Address table 705 is preferably a high-speed storage structure which is continuously updated to contain selected recently accessed addressing data of first memory 503.

Recall that FEP 102 includes a plurality of ports, and is operative to connect a plurality of MCAMs 100 together. In accordance with the embodiment of FIG. 7, FEP 102 provides for direct connections to X.25 TCP/IP network interface 104 (although only one is illustrated). Accordingly, there is a TCP/IP layer within FEP 102 that is operative to maintain and route to the TCP/IP interface 502a of the one or more MCAM 100 subsystems and to the X.25 TCP/IP WAN 104. FEP 102 also includes a main TCP/IP stack (not shown) which is operative to maintain, and is used to control, all TCP/IP interfaces within FEP 102. The TCP/IP stacks within each of the one or more MCAM 100 subsystems are each a sub-stack of the FEP TCP/IP stack, and are operative to maintain, and are used to control, all interfaces within their respective MCAM 100.

FIG. 8 illustrates a flow diagram for routing a data packet through a processing system network in accordance with the principles of the present invention. The processing system network preferably includes a plurality of sub-networks, such as LANs 103 and WAN 104 of FIGS. 1, 2 and 7. Each of the sub-networks includes at least one network node 105.

More particularly, one or more data packets are routed through a network portal device, such as MCAM 100 for example. Recall that one preferred exemplary embodiment for using and/or distributing the present invention is as software. The software includes a plurality of processing unit instructions which are stored to a conventional storage medium. A preferred exemplary software source code implementation is attached hereto as an Appendix.

At least one address is stored for each one of the sub-networks in a first memory 503 (process step 801). The memory includes at least one routing address for each LAN and each WAN coupled to the portal device, and typically includes the address of one or more of the nodes of each of the respective LANs and WANs. In the event that a particular network node is itself a LAN or a WAN, the addresses of one or more of its nodes may also suitably be stored therein.

A first data packet is received by the portal device from a first sub-network (input/output step 802). The received data packet preferably includes destination indicia among other information/data. The destination indicia identifies the one or more nodes of one or more sub-networks to which the received data packet is to be routed. In alternate preferred embodiments, the received data packet also includes source indicia. The source indicia identifies the one or more nodes of the first sub-network from which the data packet was transmitted.

The portal device determines whether an associated address for each one of the one or more destination sub-networks, and/or the one or more nodes of the one or more destination sub-networks, is stored within a second memory 504 (decision step 803). Second memory 504 preferably selectively stores at least one address for particular ones of the sub-networks, and/or their nodes. Routing one or more data packets to these particular destination sub-networks and/or network nodes requires little or no additional/special processing, as previously discussed.

In alternate exemplary embodiments, assuming there are at least two destination nodes of one or more destination sub-networks, the two or more nodes may suitably be processed sequentially, in parallel, selectively, or the like. The techniques for performing such processing, and in particular associated memory accesses, are known.

In the event that one or more associated addresses are stored in second memory 504 (YES branch of decision step 803), then at least one of those addresses are retrieved therefrom (process step 804). Otherwise (NO branch of decision step 803) one or more addresses are retrieved from first memory 503 (process step 805). The received data packet is routed to each of the one or more destination sub-networks, and/or network nodes, using the one or more retrieved addresses (process step 806).

In alternate exemplary embodiments, assuming there are at least two destination nodes of one or more destination sub-networks, the two or more nodes may suitably be routed sequentially, in parallel, selectively, or the like. In other words, all of the addresses of the two or more nodes may be completely or partially retrieved and then the data packet may suitably be routed sequentially, in parallel, selectively or the like to the two or more destination nodes. In another alternate embodiment, the addresses of the two or more nodes may be sequentially or selectively retrieved and then the data packet may suitably be routed sequentially, in parallel, selectively or the like to the two or more destination nodes.

In the event that a particular destination address is not stored in second memory 504 (NO branch of decision step 803), a determination is made as to whether a data packet directed to the particular destination address requires additional/special processing (decision step 807), as previously discussed. If the particular destination address does not require additional/special processing (NO branch of decision step 807), then it is suitably stored in second memory 504 (process step 808).

Although decision and process steps 807 and 808, respectively, are illustrated as being performed substantially in parallel with process step 806, in alternate exemplary embodiments, steps 807 and 808 may suitably be performed before, after or in combination with step 806.

Figure 9A:
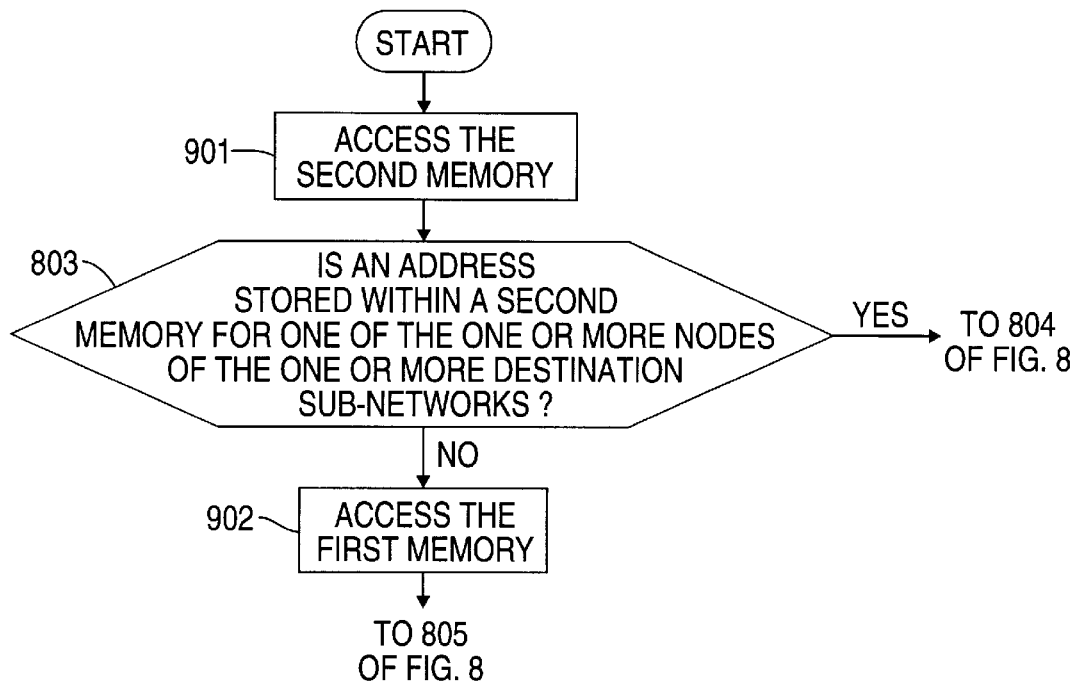
FIG. 9a illustrates an exemplary flow diagram for sequentially accessing a first memory and a second memory in accordance with one embodiment of the principles of the present invention.

FIG. 9a illustrates an exemplary flow diagram for sequentially accessing first and second memories 503 and 504, respectively. In accordance with determining whether an address has been stored in second memory 504 for one or more destination sub-networks, and/or their respective nodes, second memory 504 is accessed (process step 901). In the event that the address has not been stored in second memory 504 (NO branch of decision step 803), first memory 503 is accessed (process step 902).

Figure 9B:
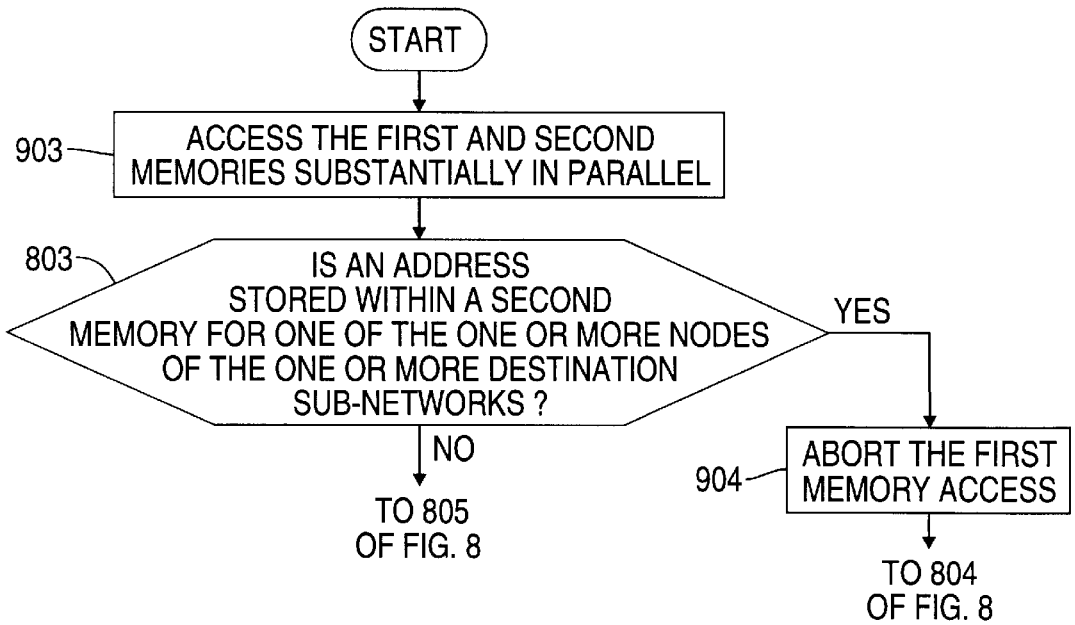
FIG. 9b illustrates an exemplary flow diagram for accessing a first memory and a second memory substantially in parallel in accordance with one embodiment of the principles of the present invention.

FIG. 9b illustrates an exemplary flow diagram for accessing substantially in parallel first and second memories 503 and 504, respectively. In accordance with determining whether an address has been stored in second memory 504 for one or more destination sub-networks, and/or their respective nodes, first and second memories 503 and 504, respectively, are accessed substantially in parallel (process step 903). In the event that the address has been stored in second memory 504 (YES branch of decision step 803), then the first memory access is aborted (process step 904). As previously discussed, an important aspect of accessing both memories in tandem is that any latency associated with the sequential accessing embodiment of FIG. 9a is substantially eliminated.

Figure 10A:
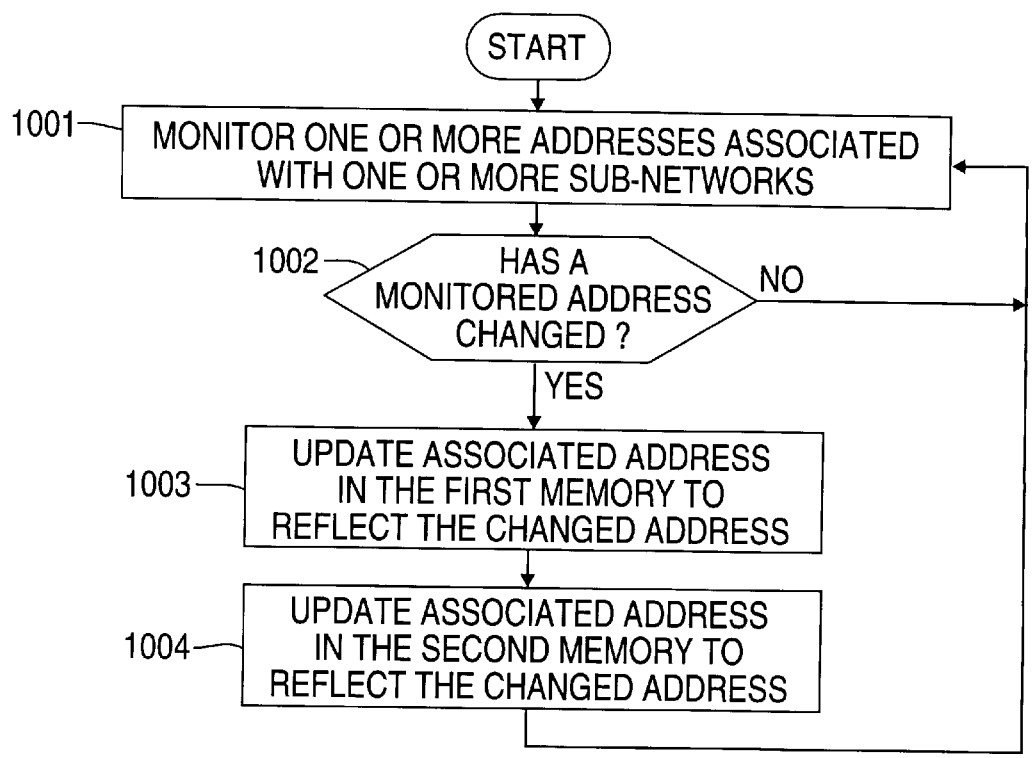
FIG. 10a illustrates an exemplary flow diagram for monitoring at least one address associated with at least one sub-network and/or network node.

FIG. 10a illustrates an exemplary flow diagram for monitoring at least one address associated with at least one sub-network and/or network node. Assuming that each one of at least a first and a second sub-network are addressable, and/or their respective nodes, at least one of a first address associated with the first sub-network or a second address associated with a second sub-network is monitored (process step 1001). A periodic determination (e.g., second, millisecond, microsecond, etc.) is suitably made as to whether one or more of the one or more monitored addresses has changed (decision step 1002).

In the event that one or more of the one or more monitored addresses has changed (YES branch of decision step 1002), an associated address in first memory 503 is updated to reflect the changed address (process step 1003). Similarly, the associated address in second memory 504, assuming such an address has suitably been stored therein, is also updated to reflect the changed address (process step 1004). In an alternate embodiment, the associated address in second memory 504 is deleted therefrom.

Figure 10B:
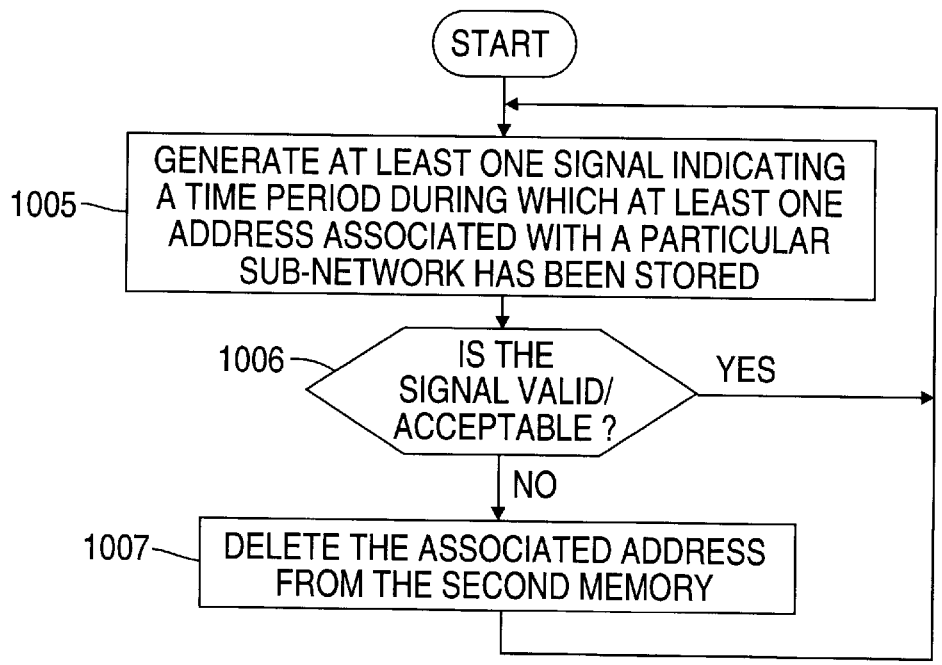
FIG. 10b illustrates another exemplary flow diagram for monitoring at least one address associated with at least one sub-network and/or network node.

FIG. 10*b* illustrates another exemplary flow diagram for monitoring at least one address associated with at least one sub-network and/or network node. At least one signal is generated indicative of a time period (e.g., minute, second, millisecond, etc.) during which at least one address associated with at least a first sub-network has been stored in second memory 504 (process step 1005). The signal is compared with a predetermined value (e.g., time limit, threshold, etc.) to determine whether the associated address is valid/acceptable (process step 1006). In the event that the signal compares unfavorably with the predetermined value (NO branch of decision step 1006), then the associated address is deleted from second memory 504 (process step 1007). In alternate preferred embodiments, when the signal compares unfavorably with the predetermined value (NO branch of decision step 1006), the associated address in second memory 504 is updated.

It should be appreciated that the present invention can substantially reduce the frequency of accesses to the IP stack for routing data packets among the nodes that are locally connected to a MCAM.

More specifically, in FIG. 7, when any one of the nodes $N-N_6$ (locally connected to MCAM 100) communicates with node $N_7$ or $N_8$ (connected to WAN 104), or with a node connected to another MCAM (not shown), IP stack 703 is accesed for routing the data packets between the two nodes.

However, when data packets are routed between any of the nodes $N_1-N_6$, the acces to IP stack 703 can be avoided, if the addresses of these two nodes can be found in address table 705.

Although the present invention and its advantages have been described in detail, it should be understood that various changes, substitutions and alterations can be made herein without departing from the spirit and scope of the invention.

APPENDIX

```
/**********************************************************************
                                                                    
           ALL RIGHTS RESERVED, COPYRIGHT (C) NCR CORP. 1994        
                                                                    
                   UNPUBLISHED PROPRIETARY INFORMATION              
                                                                    
         PROPRIETARY DATA - USE REQUIRES LICENSE FROM NCR CORP.     
                                                                    
                     OR ITS AUTHORIZED DISTRIBUTER                  
                                                                    
***********************************************************************
**
**              File Name:  ip_accel.c
**          Release Level:  1.2
**
**           Current Date:  5/3/94
**                  Time:   14:01:22
**
**       Last Change Date:  5/3/94
**                  Time:   14:01:16
**

**********************************************************************/
/**********************************************************************
* Component: Driver IP Accelerator                                    *
* Summary :  This module performs the necessary processing to         *
*            efficiently IP route data between the drivers below      *
*            it and the TCP/IP stack above it. It is a learning       *
*            IP accelerator that will constantly monitor outbound     *
*            IP datagrams usage of the lower streams for destination*
*            IP addresses. The routing tables that are used by        *
*            this module are independent of the tables used by        *
*            the main TCP/IP stack routing tables.                    *
*                                                                     *
*            This module is meant to be pushed between the SDIM       *
*            module and the drivers on the IP streams. There          *
*            are two IP streams through this module for each          *
*            Ethernet driver below it. There is one IP stream         *
*            through this module for each TR or Bounce Off            *
*            (HA-MCAM) driver below it.                               *
*                                                                     *
*            This module will never queue data on its streams         *
*            queues and therefore has no read or write service        *
*            routines. Messages received from the driver will         *
*            either go down stream to a driver module or they         *
*            will be passed up stream to the main TCP/IP stack.       *
*            Messages received from the upper streams (from the       *
*            TCP/IP stack), will always be passed down stream         *
*            to a driver.                                             *
*                                                                     *
*     The main function of the modules contained within this          *
```

- 30 -

```
*    module are as follows:                                          *
*                                                                    *
*         ipa_timer() - Routing table timeout routine                *
*         ipa_delete_route() - Delete Route Table entries routine    *
*         ipamodopen() - process open command                        *
*         ipamodclose () - process close command                     *
*         ipa_control () - process ip_accel control M_IOCTLs         *
*         ipa_config() - process ip_accel configuration M_IOCTLs     *
*         ipamoduwput() - upper write put function (i/f with SDIM)   *
*         ipamodlrput() - lower read put function (i/f with drivers) *
*         init_ipamod() - configure security module                  *
************************************************************************/ define IPA_TRACES
include <sys/errno.h>
#include <sys/stream.h>
#include <sys/sysmacros.h>
#include <sys/kmem.h>
#include <stdarg.h>
#include <string.h>
#include <stdio.h>
#include <mem.h>
#include <bss/init.h>
#include <sys/cmn_err.h>
#include <bss/register.h>
#include <sys/dlpi.h>
#include <sys/xdlpi.h>
#include <sys/param.h>
#include <sys/systm.h>
#include "uts/sys/snet/bsd_typs.h"
#include "uts/net/sdim/accel/ip_accel.h"
#include "uts/net/sdim/accel/ip_a_ioc.h"
#include <bss/trace.h>
#ifdef IPA_TRACES
#include <bss/trace.h>
#include <bss/debug.h>
endif REGISTER("IPACCEL", "ip_accel.c", "1.2", "5/3/94");

/* function prototypes */
static int ipamodopen(queue_t *, dev_t *, int, int, cred_t *);
static int ipamodclose(queue_t *, int, cred_t *);
static int ipamoduwput(queue_t *, mblk_t *);
static int ipamodlrput(queue_t *, mblk_t *);

static struct module_info ipamod_info =
    { 0, "ipamod", 0, INFPSZ, 8192, 5120 };

static struct qinit readinit =
    { ipamodlrput, 0, ipamodopen, ipamodclose, 0, &ipamod_info, 0 };
```

- 31 -

```
static struct qinit writeinit =
    { ipamoduwput, 0, 0, 0, 0, &ipamod_info, 0 };

struct streamtab ipamodinfo = { &readinit, &writeinit, NULL, NULL };
/*
 * IP SNMP Statistics control block references.
 * This module only needs to be worried about frame counts for
 * the entire IP. (When it routes or throws away a message).
 */
extern struct mib_ip   ip_mib;

#ifdef IPA_TRACES
/* define trace feature bits */
#define IPAROUTE    0x01            /* routing trace */
#define IPAERR      0x02            /* only error information */
static ulong ipa_trace_index = 1;
char *ipa_trpn[IPA_MAX_STREAMS + 1] = { /* table of product names */
    "IPA000",                       /* Filled in at config time with */
    "      ",                       /* IPAxxx were xxx: 0 < xxx < 8FF */
    "      ",
    "      ",
    "      ",
    "      ",
    "      ",
    "      ",
    "      ",
    "      ",
    "      ",
    "      ",
    "      ",
    "      ",
    "      ",
    "      ",
    "      ",
    "      ",
    "      "
};
/*
 * Array of streams trace control blocks:
 */
*/ TRACE_PRODUCT ipatrace[IPA_MAX_STREAMS + 1]; /* BSS Trace control blocks */
endif /*
 * Array of streams cointers
 */
ipastream_t *ipa_streams_array[IPA_MAX_STREAMS + 1] =
    { NULL, NULL, NULL, NULL, NULL, NULL, NULL, NULL, NULL, NULL,
      NULL, NULL, NULL, NULL, NULL, NULL, NULL, NULL, NULL, NULL, NULL };

/* The IP Accelerator Route Tables */
struct ipa_routing_ent *ipa_route[IPA_RTABLE_SIZE];
```

```
/* The IP Accelerator Free Routes pointer */
struct ipa_routing_ent *ipa_free_route_head = NULL;
struct ipa_routing_ent *ipa_free_route_tail = NULL;

/* The IP Accelerator Counts of Route Structures */
ulong   ipa_free_route_count = 0;
ulong   ipa_active_route_count = 0;

ulong ipa_streams_opened = 0;

/* diagnostic */
ulong   ipa_routes_rotated_wrap = 0;
ulong   ipa_routes_rotated = 0;
/* diagnostic */ boolean   ipa_routing_active = 0;

/**********************************************************************
Function        : ipa_delete_route()
Summary         : This function receives control to remove route table
                  entries from the table. When the time to depart count
                  has reached its limit ipa_timer calls this routine to
                  remove the table entry from the table. ipamodclose will
                  also call this routine to remove routes from the table
                  when the streams to the drivers are closed.

Receives        : route_entry to be removed from the table and a flag that
                  indicates whether or not the space used for the routing
                  entry should be saved or passed back to the system (via
                  a kmem_free call).
Returns         : none
**********************************************************************/
/* static */ void ipa_delete_route(struct ipa_routing_ent *route, int flag)
{
    struct ipa_routing_ent *next_route = route->next;
    struct ipa_routing_ent *prev_route = route->prev;
    ipastream_t            *stream = route->route_stream;

#ifdef IPA_TRACES
    trace3(ipatrace[stream->trace_index],IPAROUTE,
    "%6.6s:iparoute:del_route:removing to DestIP=%08X:route=%p",
        ipa_trpn[stream->trace_index],route->ip_address,route);

#endif
#ifndef_PC_
    if (ipa_route[(int)(route->hash_value/4)] == route) {
#else
    if (ipa_route[(int)(route->hash_value)] == route) {
#endif
        /*
         * route is the first on the chain
         */
#ifndef_PC_
```

```
                ipa_route[(int)(route->hash_value/4)] = next_route;
#else
                ipa_route[(int)(route->hash_value)] = next_route;
#endif
                if (next_route)
                    next_route->prev = NULL;
        } else {
            if (next_route != NULL) {
                /*
                 * route is middle in chain
                 */
                prev_route->next = next_route;
                next_route->prev = prev_route;
            } else {
                /*
                 * route is last in chain
                 */
                prev_route->next = NULL;
            }
        }
    }
    stream->routes_in_use--;
    ipa_active_route_count--;

if (flag == IPA_RESERVE) {
        /*
         * Put route structure in reserved pool
         */
        route->next = NULL;
        route->prev = NULL;
        if (ipa_free_route_count) {
            ipa_free_route_tail->next = route;
            ipa_free_route_tail = route;
        } else {
            ipa_free_route_head = route;
            ipa_free_route_tail = route;
        }
        ipa_free_route_count++;

} else {
        /*
         * free route memory
         */
        kmem_free((void *) route, sizeof(struct ipa_routing_ent));
    }

/* diagnostic */
    ipa_routes_rotated++;
    if (ipa_routes_rotated == 0)
        ipa_routes_rotated_wrap++;
    /* diagnostic */ return;
}
```

- 34 -

```
/************************************************************************
Function        :       ipa_timer()
Summary         :       This function receives control every 1 second and decrements
                        a counter in each of the routing entries. If the routing
                        table entry has passed its age limit, the table entry is
                        removed from the routing table.

If there are no more open streams through this driver, the
                        routing table is entirely erased and the timer is not
                        restarted until a new stream is built through this module.

Receives        :       none
Returns         :       none
************************************************************************/ static void ipa_timer (void)
{
    struct ipa_routing_ent *next_route = NULL;
    struct ipa_routing_ent *curr_route = NULL;
    int i = 0;

#ifdef IPA_TRACES
    trace0(ipatrace[0],IPAROUTE,
        "IPA000:iparoute:ipa_timer:timer fired looking for expired routes");
endif if (ipa_streams_opened) {
        if (ipa_active_route_count != 0) {
            /*
             * Go through the tables decrementing time to die counter and
             * remove all old entries.
             */
            for (i = 0; i < IPA_RTABLE_SIZE; i++) {
                curr_route = ipa_route [i]
                while (curr_route) {
                    next_route = curr_route ->next;
                    if ((--curr_route->time_to_die) == 0) {
                        ipa_delete_route(curr_route, IPA_RESERVE);
                    }
                    curr_route = next_route;
                }
            }
        }
        /*
         * restart the timer for expiration 1 second from now
         */
        timeout (ipa_timer, NULL, HZ);
    } else {
        /*
         * No active routes - don't start timer until a new route is
         * added.
         */
        ;
    }
}
```

- 35 -

```
} else {
    /*
     * no more active streams - erase the entire table

*/
#ifdef IPA_TRACES
        trace0(ipatrace[0],IPAROUTE,
            "IPA000:iparoute:ipa_timer:clearing entire routing table");
            #endif
        for (i = 0; i < IPA_RTABLE_SIZE; i++) {
            curr_route = ipa_route [i];
            while (curr_route) {
                next_route = curr_route->next;
                ipa_delete_route(curr_route,IPA_FREE);
                curr_route = next route;
            }
        }
    }
    return;
}
/****************************************************************************
Function    :   ipamodopen()
Summary     :   This function will verify that the open is a module open.
Receives    :   queue pointer (q), pointer to the major/minor device number
                (dev), file open flag (flag), stream open flag (sflag),
                pointer to a credentials structure (credp)
Returns     :   0 or error number
****************************************************************************/ static int ipamodopen(queue_t *q, dev_t *dev, int flag, int sflag,
                cred_t *credp)
{
    ipastream_t *stream = NULL;
    struct ipa_routing_ent *avail_head = NULL;
    struct ipa_routing_ent *avail_tail = NULL;
    struct ipa_routing_ent *avail_curr = NULL;
    int i = 0:

/* prevent compiler warnings */
    q = q;
    dev = dev;
    flag = flag;
    credp = credp;

if (sflag != MODOPEN) {
        return (-1);
    } ifdef IPA_TRACES
    trace0(ipatrace[0],IPAROUTE,
        "IPA000:iparoute:modopen:Open received");
#endif
    if ((stream = (ipastream_t *) kmem_zalloc(sizeof(ipastream_t),
```

- 36 -

```
                                                    KM NOSLEEP) ) != NULL) {
            q->q_ptr = (void *) stream;
            WR(q)->q_ptr = (void *) stream;
            /*
             * save lower queue pointers and defaults for
             * min and max sdu
             */
            stream->lower_q = WR(q);
            stream->min_sdu = 1;
            stream->max_sdu = 1500;
            stream->routes_in_use = 0;
            stream->active = IPA_ROUTE_INACT;
            /*
             * Place the stream pointer into the streams array
             */
            i = 0;
            while (i < IPA_MAX_STREAMS) {
                if (ipa_streams_array[i] == NULL) {
                    ipa_streams_array[i] = stream;
                    break;
                } else {
                    i++;
                }
            }
            /*
             * Reserve initial route structures to avoid mallocs during
             * the data path.
             */
            for (i = 0; i < IPA_ROUTE_LIMIT; i++) {
                if ((avail_curr = (struct ipa_routing_ent *)
                                kmem_zalloc(sizeof(struct ipa_routing_ent),
                                    KM NOSLEEP)) != NULL) {
                    ipa_free_route_count++;
                    if (avail_head) {
                        avail_tail->prev = NULL;
                        avail_tail->next = avail_curr;
                        avail_tail = avail_curr;
                    } else {
                        avail_head = avail_curr;
                        avail_tail = avail_curr;
                    }
                }
            }
        }
        if (ipa_free_route_head) {
            /*
             * we already have some entries in the avail list
             * add these to the end
             */
            if (avail_head) {
            ipa_free_route_tail->next = avail_head;
            ipa_free_route_tail = avail_tail;
            }
        } else {
```

- 37 -

```
              /*
               * first time no head or tail
               */
              ipa_free_route_head = avail_head;
              ipa_free_route_tail = avail_tail;
         }
         if (ipa_free_route_tail)
              ipa_free_route_tail->next = NULL;

} else {
         /* could not allocate memory - do not open */
         cmn_err(CE_NOTE, "ipamodopen:Push Failed:could not allocate memory\n");
#ifdef IPA_TRACES
         trace0(ipatrace[0],IPAERR,
              "IPA000:ipaerr:modopen:malloc failed for stream control block.");
#endif
         return (-1);
    }
    /*
     * The timer is started when the 1st stream is opened through the
     * module. When streams are closed count is decremented.
     */
    if (!ipa_streams_opened) {
         ipa_streams_opened++;
         timeout(ipa_timer, NULL, HZ);
    } else {
         ipa_streams_opened++;
    }
    return(0);
}
/************************************************************************
Function       :    ipamodclose()
Summary        :    This function is called when the stream is closed.
Receives       :    queue pointer (q), file open flag (flag), pointer to a
                    credentials structure (credp)
Returns        :    0
************************************************************************/
static int ipamodclose(queue_t *q, int flag, cred_t *credp)
{
    ipastream_t *stream = (ipastream_t *)q->q_ptr;
    struct ipa_routing_ent *next_route = NULL;
    struct ipa_routing_ent *curr_route = NULL;
    int i = 0;

/* prevent compiler warnings */
    flag = flag;
    credp = credp;

#if def IPA_TRACES
    trace1(ipatrace[stream->trace_index],IPAERR,
         "%6.6s:ipaerr:modclose:close received.",
         ipa_trpn[stream->trace_index]);
```

```
#endif
      kmem_free((void *) stream, sizeof(ipastream_t));
      ipa_streams_opened--;
      /*
       * Remove the stream pointer from the streams array
       */ i = 0;
      while (i < IPA_MAX_STREAMS) {
           if (ipa_streams_array[i] == stream) {
                ipa_streams_array [i] = NULL;
                break;
           } else {
                i++;
           }
      }
      /*
       * Update the routing table and remove all references to the
       * lost adapter.
       */
      for (i = 0; i < IPA_RTABLE_SIZE; i++) {
           curr_route = ipa_route[i];
           while (curr_route) {
                next_route = curr_route->next;
                if (curr_route->route_stream == stream) {
                     ipa_delete_route(curr route,IPA FREE);
                }
                curr route = next route;
           }
      }
      return(0);
}
/**************************************************************************
Function      :    ipa_control()
Summary       :    This function processes the IPA ROUTING_CONTROL M_IOCTL msgs.
                   The control flag within the message identifies the required
                   processing for the message.
Receives      :    queue pointer (q), streams message block pointer (mp)
Returns       :    N/A
**************************************************************************/
static void ipa_control(queue_t *q, mblk_t *mp)
{
      control_ip_accelerator_t *cntl =
                     (control_ip_accelerator t*)mp->b cont->b_rptr;

struct iocblk *iocp = (struct iocblk *) mp->b_rptr;

/* initialize ioc_count */
      iocp- >ioc_count = 0;

if (cntl->control_info == IPA_DISABLE_ROUTING) {
# if def IPA_TRACES
```

- 39 -

```
                traceO(ipatrace[0],IPAROUTE,
                    "IPA000:iparoute:ipa_control:Disable Routing IOCTL received.");
#endif
            /* disable routing */
            ipa_routing_active = FALSE;
            /*
             * ACK the message and send it up stream
             */
            mp->b_datap->db_type = M_IOCACK;
            qreply (q, mp);

} else if (cntl->control_info == IPA_ENABLE_ROUTING) { ifdef IPA_TRACES
                traceO(ipatrace[0],IPAROUTE,
                    "IPA000:iparoute:ipa_control:Enable Routing IOCTL received.");
#endif
            /* enable routing */
            ipa_routing_active = TRUE;
            /*
             * ACK the message and send it up stream
             */
            mp->b_datap->db_type = M_IOCACK;
            qreply (q, mp);

} else if (cntl->control_info == IPA_FLUSH_TABLES) {

/* clear out the tables */
            struct ipa_routing_ent *next_route = NULL;
            struct ipa_routing_ent *curr_route = NULL;
            int i = 0;

#ifdef IPA_TRACES
                traceO(ipatrace[0],IPAROUTE,
                    "IPA000:iparoute:ipa_control:Flush Tables IOCTL received.");
#endif
            for (i = 0; i < IPA_RTABLE_SIZE; i++) {
                curr_route = ipa_route[i];
                while (curr_route) {
                    next_route = curr_route->next;
                    ipa_delete_route(curr_route,IPA_RESERVE);
                    curr_route = next_route;
                }
            }
            /*
             * ACK the message and send it up stream
             */
            mp->b_datap->db_type = M_IOCACK;
            qreply (q, mp);
        } else {
#ifdef IPA_TRACES
                traceO(ipatrace[0],IPAERR,
```

- 40 -

```
                "IPA000:ipaerr:ipa_control:Unknown Control Value IOCTL received.");
#endif
        /*
         * unknown control value:
         * NACK the message and send it up stream
         */
        iocp->ioc_error = ENODEV;
        mp->b_datap->db_type = M_IOCNAK;
        qreply (q, mp);
    }
    return;
}
/*************************************************************************
Function        :       ipa config()
Summary         :       This function processes the IPA_CONFIG_STREAM M_IOCTL msgs.
                        The parameters within the M_IOCTL determine the IP Address
                        and Mask to be used for this interface and also define the
                        PPA that will be used for the lower interface. The PPA can be
                        either an integer in the range of 1 - 8 (inclusive) or a
                        value for a Bounce Off Driver interface that has a range of
                        100 to 8FE.
Receives        :       queue pointer (q), streams message block pointer (mp), and
                        the stream pointer.
Returns         :       N/A
*************************************************************************/
static void ipa_config(queue_t *q, mblk_t *mp, ipastream_t *stream)
{
    config_ip_accelerator_t *parms =
        (config_ip_accelerator_t*)mp->b_cont->b_rptr;

struct iocblk *iocp = (struct iocblk *) mp->b_rptr;
#ifdef IPA_TRACES
    int i = 0;
    boolean   already_added = FALSE;
    char turnon[16];

trace2(ipatrace[0],IPAROUTE,
        "IPA000:iparoute:ipa_config:Config IOCTL rcvd for ppa=%03X:ip=%08x.",
        parms->slot_number,parms -> ip_address);
#endif
    /* initialize ioc_count */
    iocp->ioc count = 0;

stream->ppa = parms->slot_number;
    stream->my_ip = parms->ip_address;
    stream->my ip subnet_mask = parms->subnet mask;

#ifdef IPA_TRACES
    /*
     * Determine if product name has already been added to BSS trace
     * This only would happen for ethernet (as it has 2 IP streams/intf).
     */
    for (i = 0; ( (i < IPA_MAX_STREAMS) && (!already_added)); i++ ) {
```

- 41 -

```
              ipastream_t *other_stream = ipa_streams_array[i];

if ((other_stream) &&
                  (other_stream->trace_index) &&
                  (other_stream != stream) &&
                  (other_stream->ppa == stream->ppa)) {
                  already_added = TRUE;
                  stream->trace_index = other_stream->trace_index;
              }
         }
         if (already_added == FALSE) {
              /*
               * Give the stream a new trace index and continue...
               */
              stream->trace_index = ipa_trace_index++;
              /*
               * create trace name entry and register traces with BSS:
               */
              sprintf(ipa_trpn[stream->trace_index],"IPA%03X",stream->ppa);
              trace_product(&ipatrace[stream->trace_index],
ipa_trpn[stream->trace_index]);
trace_feature(&ipatrace[stream->trace_index],IPAROUTE,"route");
trace_feature(&ipatrace[stream->trace_index],IPAERR,"err");

sprintf(turnon,"t + %s ", ipa_trpn[stream->trace_index]);
Execute(turnon):

trace1(ipatrace[stream->trace_index],IPAROUTE,
                   "%6.6s:iparoute:ipa_config:trace started",
                   ipa_trpn[stream->trace_index]);
         }
#endif
         /*
          * ACK the message and send it up stream
          */
         mp->b_datap->db_type = M_IOCACK;
         qreply (q, mp);
         return;
}
/***********************************************************************
Function     :    ipamoduwput()
Summary      :    This function will only perform additional processing on
                  M_PROTO DL_UNITDATA_REQ messages and on IP Accelerator M
                  IOCTLs.

For M_PROTO DL_UNITDATA_REQ messages a routine will be called
                  to learn the route specified within the message.

For M_IOCTLs of IPA_ENABLE_ROUTING, IPA_DISABLE_ROUTING, and
                  IPA_CONFIG_STREAM this routine will perform its processing
                  and pass the response back up stream. All other messages flow
                  through this module.
```

```
Receives      :    queue pointer (q), streams message block pointer (mp)
Returns       :    0
*************************************************************************/ static int ipamoduwput(queue_t *q, mblk_t *mp)
{
    ipastream_t  *stream = (ipastream_t *)q->q_ptr;
    ulong        primitive = *((ulong *)mp->b_rptr);
    int          priority = 0;
    switch (mp->b_datap->db_type) { case M_PROTO:
            if (ipa_routing_active == FALSE) {
                /* IP Accelerator is inactive */
#ifdef IPA_TRACES
                trace4(ipatrace[stream->trace_index],IPAROUTE,
                    "%6.6s:iparoute:uwput:M_PROTO rcvd:Not routing mp=%p "
                    "b_cont=%p prim=%d",
                    ipa_trpn[stream->trace_index], mp, mp->b_cont, primitive);
#endif
                putnext(q, mp);
                return(0);
            }
            if (primitive == DL_UNITDATA_REQ) {
                ip_header_t *iphdr = (ip_header_t *)(mp->b_cont->b_rptr);
                struct ipa_routing_ent * route = NULL;
                ulong       dest_ip = iphdr->destination_address;
                ulong       dest_iphost_mask = (stream->my_ip_subnet_mask
                                                  ^ IP_ADDR_ALL_ONES);

ulong       dest_iphost = (dest_ip & dest_iphost_mask);
                ulong       route_count = ipa_active_route_count;
#ifdef IPA_TRACES
                trace4(ipatrace[stream->trace_index],IPAROUTE,
                    "%6.6s:iparoute:uwput:UNITDATA_REQ from SDIM mp=%p:"
"b_cont=%p:DestIP=%08X",
                    ipa_trpn[stream->trace index],mp,mp->b_cont,
                    dest_ip);
#endif
                /*
                 * Only add real IP addresses to the table: do not
                 * add IP broadcast addresses or my IP address to the
                 * table.
                 * Broadcast addresses are all zeros or all 1's for
                 * last byte of IP address.
                 */
                if ((dest_iphost) &&
                    (dest_iphost != dest_iphost_mask) &&
                    (dest_ip != stream->my_ip)) {
#ifdef IPA_TRACES
                    trace2(ipatrace[stream->trace_index],IPAROUTE,
"%6.6s:iparoute:uwput:calling update routes DestIP=%08X",
ipa_trpn[stream->trace_index],
```

- 43 -

```
                                dest_ip);
#endif
                        priority = splos();
                        /*
                         * Update routing tables and then send
                         * message block to the adapter
                         */
                        route = ipa_update_routes(iphdr,stream);

splx(priority);

if (route) {
                            dl_unitdata_req_t * dl =

(dl_unitdata_req_t *)mp->b_rptr;
                            dlsap_t *dl_sap = (dlsap_t *)
                                ((uchar *) dl + dl->dl_dest_addr_offset);
                            route->mac_length = dl->dl_dest_addr_length;
                            memcpy((void*)route->dl_sap.llc.dl_nodeaddr,
                                (void*)dl_sap->llc.dl_nodeaddr,
                                route->mac_length);
                            route->dl_sap.llc.dl_sap = dl_sap->llc.dl_sap;

memcpy((void*)route->dl_sap.llc.dl_RI,
                                (void*)dl_sap->llc.dl_RI,
                                dl_sap->llc.dl_RI[0] & TR_RCF_LEN_MASK);
#ifdef IPA_TRACES
                            trace2(ipatrace[stream->trace_index],IPAROUTE,
                                "%6.6s:iparoute:uwput:route created or modified "
                                "route=%p",ipa_trpn[stream->trace_index],route);
#endif
                            if ((route_count == 0) && (ipa_active_route_count)) {
                                /*
                                 * A route was put into use for this message,
                                 * start the timer.
                                 */
                                timeout(ipa_timer, NULL, HZ);
                            }
                        }
                    } else {
#ifdef IPA_TRACES
                        trace3(ipatrace[stream->trace_index],IPAROUTE,
                "%6.6s:iparoute:uwput:bypassed upd rts:mp=%p:DestIP=%08X",
                            ipa_trpn[stream->trace_index],mp,
                            iphdr->destination_address);
#endif
                    }
                } else if ((primitive == DL_UNBIND_REQ)
                        || (primitive == DL_DETACH_REQ)) {
                    stream->active = IPA_ROUTE_INACT;
                }
                putnext(q, mp);
            break;
```

- 44 -

```
        case M_PCPROTO:
            if ((primitive == DL_UNBIND_REQ)
             || (primitive == DL_DETACH_REQ)) {
                stream->active = IPA_ROUTE_INACT;
            }
            putnext(q, mp);
        break;

case M_IOCTL:
            /*
             * There are 2 IOCTLs for this module:
             *
             * IPA_CONFIG_STREAMS - used to configure the module, and
             * IPA_ROUTING CONTROL - used to manage the module.
             */
            {
                    struct iocblk       *iocp = (struct iocblk *) mp->b_rptr;

switch (iocp->ioc_cmd) {
                            case IPA_ROUTING_CONTROL:
#ifdef IPA_TRACES
                                    trace1(ipatrace[stream->trace_index],IPAROUTE,
                                        "%6.6s:iparoute:uwput:M_IOCTL received:"
                                        "ioc_cmd=IPA_ROUTING_CNTL",
                                        ipa_trpn[stream->trace_index]);
#endif
                                    ipa_control(q,mp);
                            break;
                            case IPA_CONFIG_STREAM:
#ifdef IPA_TRACES
                                    trace1(ipatrace[stream->trace_index],IPAROUTE,
                                        "%6.6s:iparoute:uwput:M_IOCTL received:"
                                        "ioc_cmd=IPA_CONFIG_STREAM",
                                        ipa_trpn[stream->trace_index]);
#endif
                                    /*
                                     * Go setup the configuration
                                     */
                                    ipa_config(q,mp,stream);
                            break;
                            default:
#ifdef IPA_TRACES
                                    trace2(ipatrace[stream->trace_index],IPAROUTE,
"%6.6s:iparoute:uwput:M_IOCTL passed down cmd=%08X",
ipa_trpn[stream->trace_index],iocp->ioc_cmd);
#endif
                                    /* send this message block to the adapter */
                                    putnext(q, mp );
                            break;
                    }
            }
        break;
        default:
```

- 45 -

```
#if def IPA_TRACES
            trace4(ipatrace[stream->trace_index],IPAROUTE,
                "%6.6s:iparoute:uwput:Not  MPROT   or   IOC  passed   down:"
                "mp=%p:type=%08X,prim=%d",
                ipa_trpn[stream->trace_index],mp,
                mp->b_datap->db_type,primitive);
#endif
            /* send this message block to the adapter driver */
            putnext(q, mp );
        break;
    }
    return(0);
}
/******************************************************************
Function      :    ipamodlrput()
Summary       :    This function receives control whenever a message block is
                   slaced on the stream from the drivers.

If the message block is a DL_UNITDATA_IND, then the routine
                   to determine the route is called. If the message cannot be
                   routed or if anything strange occurres, the main TCP/IP stack
                   will be called to process and route this message block.

If the message block is a DL_INFO_ACK, then this routine will
                   pull the min and max frame size values out of the message
                   block and pass the DL_INFO_ACK up stream.
Receives      :    queue pointer (q), streams message block pointer (mp)
Returns       :    0
******************************************************************/ static int ipamodlrput(queue_t *q, mblk_t *mp)
{
    ipastream_t *stream = q->q_ptr;
    ulong        primitive = *((ulong *) mp->b_rptr);

if (ipa_routing_active == FALSE) {
#ifdef IPA_TRACES
        trace5(ipatrace[stream->trace_index],IPAROUTE,
        "%6.6s:iparoute:lrput:NotRouting:mp=%p,b_cont=%p,type=%08X,prim=%d",
        ipa_trpn[stream->trace_index],mp,mp->b_cont,
        mp->b_datap->db_type,primitive);
#endif
        /*
         * Record DL_INFO_ACK data even if not routing
         */
        if (mp->b_datap->db_type == M_PCPROTO) {
            if (primitive == DL_INFO_ACK) {
                /*
                 * Get the fields from the info_ack that are necessary
                 * to correctly route data
                 */
                dl_info_ack_t *dl = (dl_info_ack_t *)mp->b_rptr;
#ifdef IPA_TRACES
```

```
                trace2(ipatrace[stream->trace_index],IPAROUTE,
"%6.6s:iparoute:lrput:INFO_ACK:MAX_SDU=%d",
                    ipa_trpn[stream->trace_index], dl->dl_max_sdu);
#endif
                stream->min_sdu = dl->dl_min_sdu;
                stream->max_sdu = dl->dl_max_sdu;
                stream->media_type = dl->dl_mac_type;

} else if (primitive == DL_BIND_ACK) { stream->active = IPA_ROUTE_ACTIVE;

}
    }
    putnext(q, mp);
    return(0);
} else {
    struct ipa_routing_ent *route_entry = NULL;

switch (mp->b_datap->db_type) { case M_PROTO
            if (primitive == DL_UNITDATA_IND) {
                ip_header_t *iphdr = (ip_header_t *)(mp->b_cont->b_rptr);
                int priority = splos();
                /*
                 * locate the correct route if we know it
                 */
                route_entry = ipa_determine_route(iphdr);

splx(priority);

if (route_entry) { ipastream_t * route_stream =
                                    route_entry->route_stream;
                    dl_unitdata_req_t *req =
                            (dl_unitdata_req_t *)mp->b_rptr;
                    dlsap_t   *reqdlsap =
                            (dlsap_t *)
                            (mp->b_rptr+DL_UNITDATA_REQ_SIZE);
#ifdef IPA_TRACES
                    trace5(ipatrace[stream->trace_index],IPAROUTE,
"%6.6s:iparoute:lrput:UNITDATA_IND:routed:mp=%p:"
"b_cont=%p:\n              DestIP=%08X:route=%p",
ipa_trpn[stream->trace_index],mp,mp->b_cont,
iphdr->destination_address,route_entry);
#endif
                                /*
                                 * If the stream pointed to by the route is
                                 * active, forward the message down stream to
                                 * the different interface.
                                 */
```

- 47 -

```
                        if (route_stream->active == IPA_ROUTE_ACTIVE) {
                            /*
                             * Adapter located to pass this message out on,
                             * update statistics for this adapter, change
                             * message to a DL_UNITDATA_REQ and then pass
                             * the message down the stream to the adapter.
                             */
                            ip_mib.ipInReceives++;
                            ip_mib.ipForwDatagrams++;
                            /*
                             * There is always enough room in the unitdata_ind
                             * for a unitdata_req due to the fact that the
                             * mp is alloc'd as sizeof(DL_UNITDATA_IND) = 24
                             * plus 2 times sizeof(dlsap_t) (25) => 50
                             * for a total of 74 bytes in the allocated mp for
                             * the indication. A request needs:
                             * sizeof(DL_UNITDATA_REQ) = 20 plus one dlsap_t
                             * for a total of 45 bytes required...
                             */
                            req->dl_primitive = DL_UNITDATA_REQ;
                            req->dl_dest_addr_length =
                                            route_entry->mac_length;
                            req->dl_dest_addr_offset = DL_UNITDATA_REQ_SIZE;
                            req->dl_reserved [0] = 0;
                            req->dl_reserved [1] = 0;

bcopy((void *)route_entry->dl_sap.llc.dl_nodeaddr,
                                  (void *)reqdlsap->llc.dl_nodeaddr,
                                  route_entry->mac_length);

mp->b_wptr = mp->b_rptr + DL_UNITDATA_REQ_SIZE +
                                            sizeof(dlsap_t);
                            /*
                             * If destination route is a TR type stream,
                             * see if Source Routing Information is needed.
                             */
                            if (route_stream->media_type == DL_TPR) { if   (route_entry->dl_sap.llc.dl_RI[0])    {
                                            bcopy(route_entry->dl_sap.llc.dl_RI,
                                                reqdlsap->llc.dl_RI,
                                                (route_entry->dl_sap.llc.dl_RI[0] &
                                                TR_RCF_LEN_MASK)):

mp->b_wptr+=(route_entry->dl_sap.llc.dl_RI
                                                    & TR_RCF_LEN_MASK);
                                    }
                            }
                            putnext(route_stream->lower_q, mp);
                        } else {
#ifdef IPA_TRACES
                            /*
                             * The destination stream is inactive at this time,
```

```
                                * pass the message upstream to TCP/IP so that it
                                * can handle it.
                                */
                               trace4(ipatrace[route_stream->trace_index],IPAROUTE,
                                  "%6.6s:iparoute:lrput:dest inactive:DestIP=%08X,"
                                  "mp=%p,b_cont=%p",
                                  ipa_trpn[route_stream->trace_index],
                                  iphdr->destination_address, mp, mp->b_cont);
#endif
                               putnext(q, mp);
                            }
                       } else {
                            /*
                             * Unknown route or we can't do the routing, pass
                             * the message upstream to SDIM.
                             */
                            if (iphdr->time_to_live == TIME_TO_LIVE_EXP) { ifdef IPA_TRACES
                               trace2(ipatrace[stream->trace_index],IPAERR,
                                  "%6.6s:ipaerr:lrput:message dropped TTL=0 mp=%p"
                                  ipa_trpn[stream->trace_index],mp);
#endif
                               ip_mib.ipInDiscards++;
                               freemsg(mp);
                            } else {
#ifdef IPA_TRACES
                               trace4(ipatrace[stream->trace_index],IPAROUTE,
                                  "%6.6s:iparoute:lrput:unknown route:DestIP=%08X,"
                                  "mp=%p,b_cont=%p",
                                  ipa_trpn[stream->trace_index],
                                  iphdr->destination_address, mp, mp->b_cont);
#endif
                               putnext(q, mp);
                            }
                       }
                  } else {
                       /*
                        * Pass message upstream
                        */
#ifdef IPA_TRACES
                       trace3(ipatrace[stream->trace_index],IPAROUTE,
"%6.6s:iparoute:lrput:not UD_IND:passed up:mp=%p:prim=%x"
                          ipa_trpn[stream->trace_index],mp,primitive);
#endif
                       putnext(q, mp);
                  }
             break;
             case M_PCPROTO:
                  if (primitive == DL_INFO_ACK) {
                       /*
                        * Get the fields from the info_ack that are necessary
                        * to correctly route data
```

- 49 -

```
                        */
                    dl_info_ack_t *dl = (dl_info_ack_t *)mp->b_rptr;
#ifdef IPA_TRACES
                    trace2(ipatrace[stream->trace_index],IPAROUTE,
"%6.6s:iparoute:lrput:INFO_ACK:MAX_SDU=%d",
                            ipa_trpn[stream->trace_index], dl->dl_max_sdu);
#endif
                    stream->min_sdu = dl->dl_min_sdu;
                    stream->max_sdu = dl->dl_max_sdu;
                    stream->media_type = dl->dl_mac_type;

} else if (primitive == DL_BIND_ACK) {
                    stream->active = IPA_ROUTE_ACTIVE;
                }
                /*
                 * Pass message upstream
                 */
                putnext(q, mp);
            break;
            default:
                /*
                 * send this message block upstream to SDIM
                 */
#ifdef IPA_TRACES
                trace3(ipatrace[stream->trace_index],IPAROUTE,
"%6.6s:iparoute:lrput:unknown msg type:mp=%p:dbtype=%x",
                        ipa_trpn[stream->trace_index],mp,mp->b_datap->db_type);

#endif
                    putnext(q, mp);
                break;
        }
    }
    return(0);
}
/********************************************************************
Function      :   init_ipamod()
Summary       :   This function is used to configure the Driver IP Router
                  module device name.
Receives      :   no parameters
Returns       :   void
********************************************************************/ static void init_ipamod(void)
{
    ipa_routing_active = FALSE;  /* initialize accelerator disabled */
fmodsw("ipamod", &ipamodinfo);

#ifdef IPA_TRACES
    trace_product(&ipatrace[0],ipa_trpn[0]);
trace_feature(&ipatrace[0],IPAROUTE,"route");
trace_feature(&ipatrace[0],IPAERR,"err");
    Execute("t + ipa000");
```

- 50 -

```
        trace0(ipatrace[0],IPAROUTE,
              "IPA000:iparoute:init_ipamod:trace started");
#endif
}
INIT(init_ipamod);

;**********************************************************************
; Name:            ipaccell.asm
; Title:           IP Accellerator assembly source code
; Revision:        1.1
; Update Date:     5/3/94 11:30:51
; Programmer:      BPH
; Documents:
;
; COPYRIGHT NCR Corp., 1994
;
; Description:
;
;**********************************************************************
;*                                                                    *
;* Externals                                                          *
;* ;**********************************************************************/
extrn ipa_route:dword
extrn ipa_free_route_head:dword
extrn ipa_free_route_tail:dword
extrn ipa_free_route_count:dword
extrn ipa_active_route_count:dword
           page      60,132
                     .486p
_FARDATA   segment   public dword er 'DATA'
DGROUP group         _FARDATA
           assume    ds:DGROUP
;**********************************************************************
;*                                                                    *
;* IP Header structure definition                                     *
;*                                                                    *
;**********************************************************************/
iph struc
version_and_length  db        ?
type_of_service     db        ?
total_length        dw        ?
identification      dw        ?
flags_and_fragment  dw        ?
time_to_live        db        ?
protocol            db        ?
checksum            dw        ?
source_address      dd        ?
destination_address dd        ?
iph ends
;**********************************************************************
;*                                                                    *
;* Route Entry structure definition                                   *
;*                                                                    *
```

```
;*****************************************************************/
route struc
ip_address          dd      ?       ;0-3 dest ip address
mac_len             dd      ?       ;4-7 length of mac address
hash_value          dd      ?       ;8-b hash index
route_stream        dd      ?       ;c-f stream pointer
time_to_die         dd      ?       ;10-13 time to live count
reserved            dd      ?       ;14-17 reserved word
next                dd      ?       ;18-1b next route in chain
prev                dd      ?       ;1c-1f prev route in chain
mac_addr            dd      ?       ;20-23 dest mac address (1st 4 bytes)
more_mac            dw      ?       ;24-25 dest mac address (last 2 bytes)
dlsap               db      ?       ;26 dlsap_t dl_sap byte
routing_info        dd      ?       ;27-and up is Token Ring Route Info route
                                     ends ;*****************************************************************
;*                                                               *
;* Route Stream structure definition                             *
;*                                                               *
;*****************************************************************/
stream struc
ppa                 dd      ?       ;0-3 ppa
my_ip               dd      ?       ;4-7 my IP address
my_ip_subnet_mask   dd      ?       ;8-b mask
min_sdu             dd      ?       ;c-f min send size
max_sdu             dd      ?       ;10-13 max send size
lower_q             dd      ?       ;14-17 lower write queue
routes_in_use       dd      ?       ;18-1b number of routes in use
media_type          dd      ?       ;1c-1f type of stream
msg_routed          dd      ?       ;20-23 count of messages routed
                                     stream ends
;*****************************************************************
;*                                                               *
;* Equates and constants                                         *
;*                                                               *
;*****************************************************************/
NETWORK_MASK    equ     000ffffffh
IP_VERSION      equ     040h
IP_MIN_HEADER   equ     5
MAX_LIFE        equ     5               ;Route entry life time - 5 seconds
IP_HASH MASK    equ     0000000fch _FARDATA ends _TEXT       segment     public dword er 'CODE'
CGROUP      group       _TEXT
            assume      cs:_TEXT,ds:_FARDATA ;*****************************************************************
;*                                                               *
;* ipa_determine_route:                                          *
;* Summary:                                                      *
```

```
;* This routine will determine whether or not we know about a route to a    *
;* given destination and whether or not the IP Accellerator has any         *
;* business in attempting to route this message.                            *
;*                                                                          *
;* The rules for IP Accellerator routing are as follows:                    *
;*    A.) If the IP Header contains IP Options, don't attempt to route it.  *
;*    B.) If the IP Header Checksum is invalid, don't attempt to route it.  *
;*    C.) If the IP Time to live has expired, don't attempt to route it.    *
;*    D.) If we know a route, try to route it.                              *
;*                                                                          *
;* This module receives the following:                                      *
;*        8 off of esp = address of IP Header                               *
;*                                                                          *
;***************************************************************************/
public ipa_determine_route
ipa_determine_route   proc    near
        push        ebp                     ;create ebp locally
        mov         ebp,esp                 ;copy esp to local ebp
        push        ebx                     ;save work registers
        push        edx
        push        esi                     ;save the buffer address
        mov         esi,8[ebp]              ;esi = address of IP header
        cmp         [esi.version_and_length], IP_ VERSION+IP_MIN_HEADER
        jne         have_options            ;if there are ip header options
                                            ; use the non normal code
;****************************************************************************
;*                                                                          *
;* Compute the IP Header Checksum for no options case                       *
;*                                                                          *
;***************************************************************************/ movzx       eax,[esi.version_and_length]  ;get first header half word
        movzx       ebx,[esi.total_length]        ;get next half word
        add         eax,ebx                       ;checksum is ones complement so
                                                  ;keep track of end around
                                                  ;carries in eax upper half
        mov         bx,[esi.identification]   ;include the third half word
        add         eax,ebx
        mov         bx,[esi.flags_and_fragment] ;include the fourth half word
        add         eax,ebx
        mov         bx,word ptr [esi.source address] ;include the seventh hw
        add         eax,ebx
        mov         bx,word ptr [esi.source_address+2] ;include the eigth hw
        add         eax,ebx
        mov         bx,word ptr [esi.destination_address] ;include the ninth
        add         eax,ebx
        mov         bx,word ptr [esi.destination_address+2] ;include the tent
        add         eax,ebx
        push        eax                       ;save for output checksum
        mov         bx, word ptr [esi.time_to_live] ;include the fifth hw
        add         eax,ebx
        mov         bx,[esi.checksum]         ;include the sixth half word
        add         eax,ebx
```

- 53 -

```
            mov      ebx,eax                      ;isolate the end around carries
            sar      ebx, 16
            add      ax, bx                       ;do the end around carry
            jnc      no_carry1                    ;test for final end around
            inc      ax                           ;do final carry
no_carry1:
            cmp      ax, 0ffffh                   ;is checksum good?
            jne      error_checksum               ;dump packet if bad ;******************************************************************
;*                                                                *
;* Decrement time to live, and compute new checksum. If the datagram is to  *
;* be forwarded, the time to live will be checked to insure it did not go   *
;* to zero                                                        *
;******************************************************************/ dec      [esi.time_to_live]           ;decrement time to live
            pop      ebx                          ; retrieve partial checksum
            movzx    eax,word ptr [esi.time_to_live] ;get the new cksum/protocol
            add      eax,ebx                      ;add the new value to partial
            mov      ebx,eax                      ;get contents
            sar      ebx, 16                      ;keep high halfword
            add      ax, bx                       ;add together
            jnc      no_carry2                    ;jump if no end around carry
            inc      ax                           ;perform end around carry
no_carry2:
            xor      ax,0ffffh                    ;ones complement the checksum
            push     dword ptr [esi.checksum      ;save current cksum
            mov      [esi.checksum],ax            ;store new checksum in datagram ;******************************************************************
;*                                                                *
;* Locate the destination, first load the network mask            *
;* we will always use ff.ff.ff.00 as our hash network mask        *
;******************************************************************/
            ebx,NETWORK_MASK                      ;load   the   default   mask   for   hash
;******************************************************************
;*                                                                *
;* Next calculate the hash index and find the route in the hash chain *
;*                                                                *
;******************************************************************/
            and      ebx,[esi.destination_address] ;mask the destination network
            mov      edx.[esi.destination_address] ;pre-load the dest IP Addr
            mov      eax,ebx                      ;calculate
            shr      eax,16                       ;   the hash
            xor      ax,bx                        ;      table
            xor      al,ah                        ;         index
            and      eax,IP_HASH_MASK             ;form the index
            mov      ebx,[eax.ipa_route           ;get the hash entry
            cmp      EBX,0                        ;determine if have an entry
            je       no_destination               ;jump if don't know destination
```

```
        cmp        edx,[ebx.ip_address]          ;are we looking for this IP?
        je         route_found                   ;jump if route found
;**********************************************************************
;*                                                                    *
;* Since the route was not first in chain, search the rest of the table to *
;* determine if there is a route to this IP.                          *
;*                                                                    *
;**********************************************************************/ network_loop:
        mov        ebx,[ebx.next]                ;get next linked entry
        cmp        ebx,0                         ;determine if have an entry
        je         no_destination                ;jump if don't know destination
        cmp        edx,[ebx.ip_address]          ;are we looking for this IP?
        jne        network_loop                  ;continue search for network
;**********************************************************************
;*                                                                    *
;* cache the found entry to the front of the list of route entries    *
;* ebx = the located route that is not at the start of the list       *
;**********************************************************************/
        mov        eax,[ebx.prev]                ;get old prev
        mov        edx,[ebx.next]                ;get old next
        mov        [eax.next],edx                ;set old prev->next to old next
        cmp        edx,0                         ;was entry at end of list
        je         end_of_list
        mov        [edx.prev],eax                ;set old next->prev to old prev
end_of_list:
        mov        eax,[ebx.hash_value]          ;get 1st entry
        mov        edx,[eax.ipa_route]           ;from hash table
        mov        [edx.prev],ebx                ;set its prev to located entry
        mov        [ebx.prev],0                  ;set located entry prev to 0
        mov        [ebx.next],edx                ;set lctd entry next to old 1st
        mov        [eax.ipa_route],ebx           ;set new 1st in list
;**********************************************************************
;*                                                                    *
;* a route with the correct IP address was located                    *
;* ebx contains the route to use                                      *
;* Note that we will never place our own IP address in the table so we don't *
;* need to worry about cycling on a frame sent to ourselves from ourselves. *
;*                                                                    *
;* ebx = the route that this datagram will be sent out on             *
;* esi = the IP Header address                                        *
;*                                                                    *
;**********************************************************************/
route_found:
        cmp        [esi.time_to_live]0           ;has time to live expired?
        je         time_expired                  ;trash datagram if yes
;**********************************************************************
;*                                                                    *
;* test if fragmentation required                                     *
;*                                                                    *
```

```
;**********************************************************************/
        mov             ax,[esi.total_length]   ;get datagram length
        xchg            al,ah                   ;correct endian
        mov             edx,[ebx.route_stream]  ;get the stream cb
        cmp             eax,[edx.max_sdu[       ;insure the datagram fits
        jnbe            need_frag               ;jump if too big
;*
;* we can route this data gram so bump counter
;*
        inc             [edx.msg_routed]
;*
;* No fragmentation and we can route the message, return the route to
;* the caller.
;*
        pop             eax                     ;remove checksum
        mov             eax, ebx                ;set route ptr as return
        pop             esi                     ;restore registers
        pop             edx
        pop             ebx
        pop             ebp
;* 75 instructions to locate and return the route!
        ret                                     ;return to caller
;**********************************************************************
;*                                                                    *
;* All of the non-normal paths.                                       *
;*                                                                    *
;**********************************************************************
;*
;* Options included in the IP header, let stack process them.
;*
have_options:
        pop             esi                     ;restore registers
        pop             edx
        pop             ebx
        pop             ebp
        mov             eax,0                   ;set no route return value
        ret
;*
;*      Errorneous check sum calculated, let stack process message.
;*
error_checksum:
        pop             eax                     ;get partial checksum off stack
        pop             esi                     ;restore registers
        pop             edx
        pop             ebx
        pop             ebp
        mov             eax,0                   ;set no route return value
        ret
;*
;* We don't have a route to the specific IP, pass up to stack.
;* The time to live value has expired, pass up to stack.
;* The message is destined for us, pass up to stack.
;* The message requires fragmentation, pass it up stack.
```

```
;*
no_destination:
time_expired:
need_frag:
        pop     eax                         ;get old checksum
        mov     [esi.checksum],ax           ;restore old value
        inc     [esi.time_to_live]          ;restore old value
        pop     esi                         ;restore registers
        pop     edx
        pop     ebx
        pop     ebp
        mov     eax,0                       ;set no route return value
        ret
ipa_determine_route endp
;**********************************************************************
;*                                                                    *
;* IPA_Update_Routes:                                                 *
;* Summary:                                                           *
;* This routine will update our current local routing tables to indicate *
;* that the IP address within the received IP header is accessible via the *
;* passed stream control block. This routine is responsible for updating *
;* or creating a new entry in our route tables. If the route is currently *
;* in our routing table, then the time to die value in that entry is given *
;* the maximum amount of time to live. If the route is currently unknown, *
;* then a new route structure is taken from the free pool and and is added *
;* to the route table. If no route entries are available in the free pool, *
;* then the route is not recorded.                                    *
;*                                                                    *
;* This module receives the following:                                *
;*       4 off of esp = address of IP Header                          *
;*       8 off of esp = address of the IP stream control block        *
;*                                                                    *
;* Returns: NULL if route already existed or if no routes avail       *
;*          ptr to new route added to table if the route was recorded *
;*                                                                    *
;**********************************************************************/
public  ipa_update_routes
ipa_update_routes proc   near
        push    ebp                         ;create ebp locally
        mov     ebp,esp                     ;copy esp to local ebp
        push    ebx
        push    edx
        push    esi                         ;save the buffer address
        mov     esi,8[ebp]                  ;esi = address of IP header
;**********************************************************************
;*                                                                    *
;* Locate the destination, first load the network mask                *
;* we will always use ff . ff . ff .00 as our hash network mask       *
;**********************************************************************/
        mov     ebx,NETWORK_MASK            ;load the default mask for hash
;**********************************************************************
;*                                                                    *
```

```
;*  Next calculate the hash index and find the route in the hash chain      *
;*                                                                          *
;****************************************************************************/
            and         ebx,[esi.destination_address]  ;mask the destination network
            mov         edx,[esi.destination_address]  ;pre-load the dest IP Addr
            mov         eax,ebx                        ;calculate
            shr         eax,16                         ;   the hash
            xor         ax, bx                         ;      table
            xor         al, ah                         ;         index
            and         eax, IP_HASH_MASK              ;form the index
            push        eax                            ;save hash value
            mov         ebx.[eax.ipa_route]            ;get the hash entry
            cmp         ebx,0                          ;determine if have an entry
            je          no_dest                        ;jump if don't know
                                                        destination
            cmp         edx,[ebx.ip_address]           ;are we looking for this IP?
            jne         network_lp2                    ;jump if not 1st in list
;****************************************************************************
;*                                                                          *
;*  The route is the first in the chain. Determine if this is a new route.  *
;*                                                                          *
;*  ebx = the located route in the chain                                    *
;*  edx = the destination IP address                                        *
;****************************************************************************/
            mov         eax, 12 [ebp]                  ;get stream ptr
            cmp         eax,[ebx.route_stream]         ;is it a new route?
            je          old_route1                     ;br if old_route
            mov         edx,[ebx.route_stream]         ;get old route stream
            dec         [edx.routes_in_use]            ;remove old route from stream
            mov         [ebx.route_stream],eax         ;set new stream
            inc         [eax.routes_in_use]            ;bump routes in use
old_route1:
            mov         [ebx.time_to_die],MAX_LIFE
            pop         eax                            ;remove hash from stack
            mov         eax,0                          ;set no change return code
            pop         esi                            ;restore all registers
            pop         edx
            pop         ebx
            pop         ebp
            ret
;****************************************************************************
;*                                                                          *
;*  Since the route was not first in chain, search the rest of the table to *
;*  determine if there is a route to this IP.                               *
;*                                                                          *
;*  ebx = the first route in the chain                                      *
;*  edx = the destination IP address                                        *
;****************************************************************************/
network_lp2:
            mov         ebx, [ebx.next]                ;get next linked entry
            cmp         ebx,0                          ;determine if have an entry
            je          no_dest                        ;jump if don't know
```

- 58 -

```
                                                                destination
        cmp        edx,[ebx.ip_address]        ;are we looking for this IP?
        jne        network_lp2                 ;continue search for network
;*******************************************************************************
;*                                                                             *
;* Determine if this is a new route or an old route.                           *
;*                                                                             *
;* ebx = the route located in the chain                                        *
;*******************************************************************************/
        mov        eax, 12 [ebp]               ;get stream ptr
        cmp        eax,[ebx.route_stream]      ;is it a new route?
        je         old_route2
        mov        edx,[ebx.route_stream]      ;get old route stream
        dec        [edx.routes_in_use]         ;remove old route from stream
        mov        [edx.route_stream,eax       ;set new stream
        inc        [eax.routes_in_use]         ;bump routes in use
;*******************************************************************************
;*                                                                             *
;* cache the found entry to the front of the list of route entries             *
;*                                                                             *
;* ebx = the route located in the chain                                        *
;*******************************************************************************/
old_route2
        mov        eax, [ebx.prev]             ;get oldprev
        mov        edx, [ebx.next]             ;get oldnext
        mov        [eax.next],edx              ;set oldprev->next to old next
        cmp        edx,0                       ;was entry at end of list
        je         endoflist
        mov        [edx.prev],eax              ;set oldnext->prev to old prev
endoflist:
        pop        eax                         ;get hash from stack
        mov        edx,[eax.ipa_route]         ;get old first
        mov        [edx.prev],ebx              ;set its prev to located entry
        mov        [ebx.prev],0                ;set located entry prev to 0
        mov        ebx.next],edx               ;set next to old 1st
        mov        [eax.ipa_route],ebx         ;set new 1st in chain
;*******************************************************************************
;*                                                                             *
;* Reset time to live for route to the max.                                    *
;*                                                                             *
;* ebx = the route located in the chain                                        *
;*******************************************************************************/
        mov        [ebx.time_to_die],MAX_LIFE
        mov        eax,0                       ;set no change return code
        pop        esi                         ;restore all registers
        pop        edx
        pop        ebx
        pop        ebp
        ret
;*******************************************************************************
;*                                                                             *
;* We do not have a route to the specified IP address.  Get a new one from     *
;* the free pool if there are any.  If there are none, do nothing.             *
```

- 59 -

```
;*                                                                              *
;****************************************************************************/
no_dest:
        pop        ebx                              ;get hash value from stack
        cmp        ipa_free_route_count,0           ;are any routes available?
        je         no_free_routes                   ;br if no routes
        mov        eax,ipa_free_route_head          ;get available head
        mov        edx,[eax.next]                   ;get next
        mov        ipa_free_route_head,edx          ;set new head
        inc        ipa_active_route_count           ;bump routes in use
        dec        ipa_free_route_count             ;remove 1 route from free pool
        cmp        ipa_free_route_count,0
        jne        more_free_routes
        mov        ipa_free_route_head,0            ;initialize free pointers
        mov        ipa_free_route_tail,0
;*****************************************************************************
;*                                                                              *
;* Set up the new route control block structure to match this route             *
;*                                                                              *
;* eax = new route to add to the head of the route table chain                  *
;* ebx = hash value                                                             *
;* esi = the iphdr address                                                      *
;****************************************************************************/
more_free_routes:
        mov        [eax.prev],0
        mov        [eax.next],0                     ;initialize prev/next to
        mov        edx,[esi.destination_address]    ;get IP addr
        mov        [eax.ip_address],edx             ;set IP addr
        mov        edx,12[ebp]                      ;get stream ptr
        mov        [eax.route_stream],edx           ;set route stream
        mov        [eax.hash_value],ebx             ;set route hash
        inc        [edx.routes_in_use]
        mov        [eax.time_to_die],MAX_LIFE       ;set max life
;*****************************************************************************
;*                                                                              *
;* place the new route into the front of the list of route entries              *
;*                                                                              *
;* eax=new route                                                                *
;* ebx=hash value                                                               *
;****************************************************************************/
        mov        edx,[ebx.ipa_route]              ;get the first hash entry
        cmp        edx,0                            ;determine if other entries
        je         first_in_list                    ;jump if no other entries
        mov        [edx.prev],eax                   ;set old first->prev to new
        mov        [eax.next],edx                   ;set new next to old first
first_in_list:
        mov        [ebx.ipa_route],eax
        pop        esi
        pop        edx
        pop        ebx
        pop        ebp
        ret
no_free_routes:
```

```
            pop     esi
            pop     edx
            pop     ebx
            pop     ebp
            mov     eax,0                   ;set no route change
            ret
ipa_update_routes endp
_TEXT       ends
            end
```

I claim:

1. An apparatus for routing data packets between sub-networks of a processing system network, said apparatus comprising:

a first means for storing addressing data for routing said data packets between said sub-networks;

a second means, associated with said first means, for storing recently accessed addressing data for routing ones of said data packets between ones of said sub-networks;

a control circuit, associated with said first means and said second means, that routes said data packets between sub-networks in response to said recently accessed addressing data and destination indicia associated with said data packets; and a timing circuit, associated with said control circuit, that indicates time periods during which said recently accessed addressing data are stored in said second means, wherein said control circuit deletes at least one of said recently accessed addressing data from said second means whenever a time period associated with said at least one recently accessed addressing data exceeds a maximum value said deletion thereby eliminating least recently accessed addressing data from said second means.

2. The apparatus as set forth in claim 1 wherein first sub-network and said second sub-network is one of a local area network and a wide area said control circuit is operative to determine whether both a first sub-network and a second sub-network are local area networks.

3. The apparatus as set forth in claim 2 wherein said control circuit, in the event that both said first sub-network and said second sub-network are local area networks, is further operative to store a routing address retrieved from said first means in said second means.

4. The apparatus as set forth in claim 1 wherein said control circuit, in the event that a routing address is not stored in said second means, is operative to determine whether a received data packet requires special processing.

5. The apparatus as set forth in claim 4 wherein said control circuit, in the event that said received data packet does not require special processing, is further operative to store said routing address in said second means.

6. The apparatus as set forth in claim 1 wherein said control circuit is operative to access initially said second means and, in the event that said routing address data is not stored in said second means, to access said first means.

7. The apparatus as set forth in claim 1 wherein said control circuit is operative to access initially substantially in parallel said first means and said second means.

8. The apparatus as set forth in claim 7 wherein said control circuit, in the event that a routing address is stored in said second means, is further operative to abort accessing said first means.

9. The apparatus as set forth in claim 1 further comprising a plurality of interfaces wherein each one of said plurality of interfaces has an address associated therewith, said control circuit is further operative to use said addresses to communicate with said sub-networks.

10. The apparatus as set forth in claim 9 wherein said control circuit is further operative to monitor at least one of said interfaces to determine whether an address of said at least one of said interfaces changed.

11. The apparatus as set forth in claim 10 wherein said control circuit, in the event that said address of said at least one of said interfaces changed, is further operative to at least one of:

delete said changed address from said second means, and update said second means to reflect said changed address.

12. The apparatus as set forth in claim 10 wherein said control circuit, in the event that said address of said at least one of said interfaces changed, is further operative to update said first means to reflect said changed address.

13. The apparatus as set forth in claim 1 wherein said timing circuit is further operative to compare said time periods with a predetermined value.

14. The apparatus as set forth in claim 13 wherein said control circuit, in response to said comparison, is further operative to at least one of delete certain address data from said second means and update said second means in response certain address data stored in said first means.

15. A method for routing data packets between sub-networks of a processing system network, said method comprising the steps of:

storing an address for each of said sub-networks in a first memory;

storing recently accessed addresses for particular ones of said sub-networks in a second memory;

routing said data packets between sub-networks in response to said recently accessed addresses and destination indicia associated with said data packets;

using a timing circuit to indicate time periods during which said recently accessed addresses are stored in said second memory; and deleting at least one recently accessed address from said second means whenever a time period associated with said at least one recently accessed address exceed a maximum value, said deletion thereby eliminating least recently accessed addresses from said second memory.

16. The method as set forth in claim 15 further including, upon a determination that a particular address is not stored in said second memory, the step of storing said particular address from said first memory in said second memory.

17. The method as set forth in claim 15 further including the steps of:

accessing said second memory; and accessing said first memory in the event that a particular address is not stored in said second memory.

18. The method as set forth in claim 15 wherein said routing step is preceded by the step of accessing substantially in parallel said first memory and said second memory.

19. The method as set forth in claim 18 further including the step of aborting said first memory access in the event that a particular address is stored in said second memory.

20. The method as set forth in claim 15 further including the step of monitoring at least one of said sub-networks to determine whether any of said addresses has changed.

21. The method as set forth in claim 20 further including, in the event that at least one of said addresses has changed, one of the steps of:

deleting said changed address from said second memory; and updating said second memory to reflect said changed address.

22. The method as set forth in claim 20 further including, in the event that, at least one of said addresses has changed, the step of updating said first memory to reflect said changed address.

23. The method as set forth in claim 15 further comprising the steps of:

comparing said time periods with a predetermined value; and deleting, in response to said comparison, at least one address from said second memory.

24. A processing system network comprising:
a plurality of sub-networks wherein each said sub-networks includes at least one node; and
an apparatus for routing data packets between said plurality of sub-networks, said apparatus comprising:
  a first means for storing addresses for routing data packets between ones of said plurality of sub-networks;
  a second means, associated with said first means, for storing ones of said recently accessed addresses for use in routing ones of said data packets between particular ones of said plurality of sub-networks;
  a control circuit, associated with said first means and said second means, arranged to route said data packets between said plurality of sub-networks in response to said recently accessed addresses and destination indicia associated with said data packets; and
  a timing circuit, associated with said control circuit, that indicates time periods during which said recently accessed addresses are stored in said second means, wherein said control circuit deletes at least one recently accessed address from said second means whenever a time period associated with said at least one recently accessed address exceeds a maximum value, said deletion thereby eliminating least recently accessed addresses from said second means.

25. The network as set forth in claim 24 wherein said control circuit is operative to determine whether a particular received data packet requires special processing.

26. The network as set forth in claim 25 wherein said control circuit, in the event said particular received data packet does not require special processing, is further operative to store a retrieved address from said first means in said second means.

27. The network as set forth in claim 24 wherein said control circuit is operative to access initially said second means and then said first means in the event that a particular address is not stored therein.

28. The network as set forth in claim 24 wherein said control circuit is operative to access substantially in parallel said first means and said second means.

29. The network as set forth in claim 28 wherein said control circuit, in the event that a particular address is selectively stored in said second means, is further operative to abort accessing said first means.

30. The network as set forth in claim 24 wherein said apparatus includes a plurality of interfaces, wherein ones of said plurality of interfaces have an address associated therewith, and wherein said control circuit is further operative to use ones of said addresses to communicate with ones of said plurality of sub-networks.

31. The network as set forth in claim 30 wherein said control circuit is further operative to monitor at least one of said interfaces to determine whether at least one of said addresses has changed.

32. The network as set forth in claim 31 wherein said control circuit, in response to at least one of said monitored addresses being changed, is further operative to update at least one of said first means and said second means to reflect said changed address.

33. The network as set forth in claim 24 wherein said control circuit is further operative to:
  compare said time periods with a predetermined value; and
  delete, in response to said comparison, at least one address from said second means.

* * * * *

UNITED STATES PATENT AND TRADEMARK OFFICE
CERTIFICATE OF CORRECTION

PATENT NO. : 5,862,344

DATED : January 19, 1999

INVENTOR(S) : Benjamin P. Hart

It is certified that error appears in the above-identified patent and that said Letters Patent is hereby corrected as shown below:

Column 79, line 26, delete "first sub-network and said second sub-network is one of a local area network and a wide area".

Signed and Sealed this

Twenty-eighth Day of December, 1999

Attest:

Q. TODD DICKINSON

*Attesting Officer*     *Acting Commissioner of Patents and Trademarks*